US011307427B2

(12) United States Patent
Kusafuka

(10) Patent No.: US 11,307,427 B2
(45) Date of Patent: Apr. 19, 2022

(54) IMAGE DISPLAY DEVICE, IMAGE DISPLAY SYSTEM, HEAD-UP DISPLAY, MOVING BODY, AND IMAGE DISPLAY METHOD

(71) Applicant: KYOCERA Corporation, Kyoto (JP)

(72) Inventor: Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/255,165

(22) PCT Filed: Jun. 21, 2019

(86) PCT No.: PCT/JP2019/024778
§ 371 (c)(1),
(2) Date: Dec. 22, 2020

(87) PCT Pub. No.: WO2020/004276
PCT Pub. Date: Jan. 2, 2020

(65) Prior Publication Data
US 2021/0263326 A1 Aug. 26, 2021

(30) Foreign Application Priority Data

Jun. 26, 2018 (JP) .............................. JP2018-121077

(51) Int. Cl.
*G02B 27/01* (2006.01)
*B60K 35/00* (2006.01)

(52) U.S. Cl.
CPC .......... *G02B 27/0179* (2013.01); *B60K 35/00* (2013.01); *B60K 2370/149* (2019.05); *B60K 2370/1529* (2019.05); *G02B 2027/0187* (2013.01)

(58) Field of Classification Search
CPC ........ G02B 27/0179; G02B 2027/0187; B60K 35/00; B60K 2370/1529; B60K 2370/149
See application file for complete search history.

(56) References Cited

U.S. PATENT DOCUMENTS

| 2010/0118045 A1* | 5/2010 | Brown Elliott ........ G09G 3/003 345/589 |
| 2012/0200680 A1* | 8/2012 | So ........................ H04N 13/383 348/54 |
| 2013/0241922 A1 | 9/2013 | Kim et al. |

(Continued)

FOREIGN PATENT DOCUMENTS

| JP | 2011-505017 A | 2/2011 |
| JP | 2016-213552 A | 12/2016 |

(Continued)

*Primary Examiner* — Dmitriy Bolotin
(74) *Attorney, Agent, or Firm* — Studebaker & Brackett PC

(57) ABSTRACT

An image display device includes a display panel, an optical element, an acquisition unit, and a controller. The controller is configured to be able to switch an image displayed on subpixels between a left eye image and a right eye image. The display panel includes red subpixels and green subpixels which are different in a width in an x direction. The controller is configured to control the plurality of subpixels as a group, and is configured so that, when an image displayed by one red subpixel belonging to the group is changed from the left eye image to the right eye image, an image displayed by another red subpixel belonging to the same group is changed from the left eye image to the right eye image.

16 Claims, 19 Drawing Sheets

(56) References Cited

U.S. PATENT DOCUMENTS

| | | | |
|---|---|---|---|
| 2013/0249976 A1 | 9/2013 | Kunieda et al. | |
| 2014/0009463 A1* | 1/2014 | Watanabe | H04N 13/317 |
| | | | 345/419 |
| 2014/0340746 A1* | 11/2014 | Watanabe | G09G 3/003 |
| | | | 359/464 |
| 2015/0362740 A1 | 12/2015 | Hamagishi et al. | |
| 2016/0323568 A1* | 11/2016 | Guido | H04N 13/324 |
| 2018/0089935 A1* | 3/2018 | Froy, Jr. | G07F 17/3213 |
| 2018/0199030 A1* | 7/2018 | Smith | H04N 13/366 |
| 2018/0372923 A1* | 12/2018 | Wijaya | G02B 27/0179 |
| 2020/0096796 A1* | 3/2020 | Acreman | G02B 30/31 |
| 2020/0132993 A1* | 4/2020 | Kusafuka | G02B 30/26 |

FOREIGN PATENT DOCUMENTS

| | | |
|---|---|---|
| WO | 2008100826 A1 | 8/2008 |
| WO | 2013094192 A1 | 6/2013 |

\* cited by examiner

IMAGE DISPLAY DEVICE, IMAGE DISPLAY SYSTEM, HEAD-UP DISPLAY, MOVING BODY, AND IMAGE DISPLAY METHOD

CROSS-REFERENCE TO RELATED APPLICATION

This application claims priority to Japanese Patent Application No. 2018-121077, which was filed on Jun. 26, 2018, the contents of which are incorporated herein by reference in its entirety.

TECHNICAL FIELD

The present disclosure relates to an image display device, an image display system, a head-up display, a moving body, and an image display method.

BACKGROUND

A display device has been proposed (for example, refer to U.S. Patent Application Publication No. 2015/0362740 (Patent Literature 1)) in which a display panel with subpixels arranged horizontally and vertically and a plurality of band-shaped parallax barriers extending in a diagonal direction of the subpixels are used to allow a parallax image to reach left and right eyes to display a three-dimensional image. The extension of the parallax barrier in the diagonal direction contributes to reducing the occurrence of moire and the like. In an image display device of the related art that performs three-dimensional display, it is assumed that lengths of subpixels in a parallax direction of the left and right eyes are the same width.

SUMMARY

An image display device according to one embodiment of the disclosure includes a display panel, an optical element, an acquisition unit, and a controller. The display panel includes a plurality of subpixels arranged in a grid along a first direction corresponding to a parallax direction of a user and a second direction intersecting the first direction. The optical element is configured to define a light beam direction of an image displayed on the display panel. The acquisition unit is configured to acquire a first position of a first eye of the user and a second position of a second eye of the user, the second eye being different from the first eye. The controller is configured to be able to switch a display position for displaying a first image and a second image for each subpixel included in the plurality of subpixels based on the first position and the second position. The first image is an image visually recognized by the first eye of the user. The second image is an image visually recognized by the second eye of the user. The plurality of subpixels include a plurality of first subpixels configured to emit light of a first color and a plurality of second subpixels configured to emit light of a second color different from the first color, and a length of the first subpixels along the first direction is different from a length of the second subpixels along the first direction. The controller is configured to control the plurality of subpixels including the plurality of first subpixels and the plurality of second subpixels as a group. The controller is configured so that, when an image displayed by one first subpixel belonging to the group is changed from the first image to the second image, an image displayed by another first subpixel belonging to the group is changed from the second image to the first image.

An image display system according to one embodiment of the disclosure includes a display panel, an optical element, a detection device, and a controller. The display panel includes a plurality of subpixels arranged in a grid along a first direction corresponding to a parallax direction of a user and a second direction intersecting the first direction. The optical element is configured to define a light beam direction of an image displayed on the display panel. The detection device is configured to be able to detect a first position of a first eye of the user and a second position of a second eye of the user, the second eye being different from the first eye. The controller is configured to be able to switch a display position for displaying a first image and a second image for each subpixel included in the plurality of subpixels based on the first position and the second position detected by the detection device. The first image is an image visually recognized by the first eye of the user. The second image is an image visually recognized by the second eye of the user. The plurality of subpixels include a plurality of first subpixels configured to emit light of a first color and a plurality of second subpixels configured to emit light of a second color different from the first color, and a length of the first subpixels along the first direction is different from a length of the second subpixels along the first direction. The controller is configured to control the plurality of subpixels including the plurality of first subpixels and the plurality of second subpixels as a group. The controller is configured so that, when an image displayed by one first subpixel belonging to the group is changed from the first image to the second image, an image displayed by another first subpixel belonging to the group is changed from the second image to the first image.

A head-up display according to one embodiment of the disclosure includes a display panel, an optical element, a detection device, a controller, and an optical system. The display panel includes a plurality of subpixels arranged in a grid along a first direction corresponding to a parallax direction of a user and a second direction intersecting the first direction. The optical element is configured to define the light beam direction of an image displayed on the display panel. The detection device is configured to be able to detect a first position of a first eye of the user and a second position of a second eye of the user, the second eye being different from the first eye. The controller is configured to be able to switch a display position for displaying a first image and a second image for each subpixel included in the plurality of subpixels based on the first position and the second position detected by the detection device. The first image is an image visually recognized by the first eye of the user. The second image is an image visually recognized by the second eye of the user. The optical system is configured to project a virtual image of the display panel, and the optical system is arranged on a side of the display panel and the optical member on which side the user's eyes are positioned. The plurality of subpixels include a plurality of first subpixels configured to emit light of a first color and a plurality of second subpixels configured to emit light of a second color different from the first color, and a length of the first subpixels along the first direction is different from a length of the second subpixels along the first direction. The controller is configured to control the plurality of subpixels including the plurality of first subpixels and the plurality of second subpixels as a group. The controller is configured so that, when an image displayed by one first subpixel belonging to the group is changed from the first image to the second image, an image displayed by another first subpixel belonging to the group is changed from the second image to the first image.

A moving body according to one embodiment of the disclosure includes a head-up display. The head-up display includes a display panel, an optical element, a detection device, a controller, and an optical system. The display panel includes a plurality of subpixels arranged in a grid along a first direction corresponding to a parallax direction of a user and a second direction intersecting the first direction. The optical element is configured to define a light beam direction of an image displayed on the display panel. The detection device is configured to detect a first position of a first eye of the user and a second position of a second eye of the user, the second eye being different from the first eye. The controller is configured to be able to switch a display position for displaying a first image and a second image for each subpixel included in the plurality of subpixels based on the first position and the second position detected by the detection device. The first image is an image visually recognized by the first eye of the user. The second image is an image visually recognized by the second eye of the user. The optical system is configured to project a virtual image of the display panel, the optical system is arranged on a side of the display panel and the optical element on which side the user's eyes are positioned. The plurality of subpixels include a plurality of first subpixels configured to emit light of a first color and a plurality of second subpixels configured to emit light of a second color different from the first color, and a length of the first subpixels along the first direction is different from a length of the second subpixels along the first direction. The controller is configured to control the plurality of subpixels including the plurality of first subpixels and the plurality of second subpixels as a group. The controller is configured so that, when an image displayed by one first subpixel belonging to the group is changed from the first image to the second image, an image displayed by another first subpixel belonging to the group is changed from the second image to the first image.

An image display method according to one embodiment of the disclosure includes acquiring a first position of a first eye of a user and a second position of a second eye of the user by an acquisition unit, the second eye being different from the first eye. The image display method includes displaying a first image or a second image on each of a plurality of subpixels based on the first position and the second position by a controller. The plurality of subpixels are included in the display panel and are arranged in a grid along a first direction corresponding to a parallax direction of the user and a second direction intersecting the first direction. The image display method includes causing the first image to reach the first eye of the user and the second image to reach the second eye of the user, by an optical element. The plurality of subpixels include a plurality of first subpixels configured to emit light of a first color and a plurality of second subpixels configured to emit light of a second color different from the first color, and a length of the first subpixels along the first direction is different from a length of the second subpixels along the first direction. The controller is configured to control the plurality of subpixels including the plurality of first subpixels and the plurality of second subpixels as a group. The controller is configured so that, when an image displayed by one first subpixel belonging to the group is changed from the first image to the second image, an image displayed by another first subpixel belonging to the group is changed from the second image to the first image.

DETAILED DESCRIPTION

In an image display device of the related art that performs three-dimensional display, a plurality of subpixels constituting one pixel each have the same length in the horizontal direction. In the image display device, there is a case where the area of the subpixel is desired to be changed for each color. For example, the area of the G (green) subpixel with a high luminosity factor is desired to be made wider than the areas of the R (red) and B (blue) subpixels to improve the visual transmittance of the display panel of the image display device. The luminosity factor is a quantity that represents the brightness that is visually perceived. However, in the related art, there has been no method of controlling the image reaching the left and right eyes when the horizontal lengths of the subpixels are different. If the horizontal widths of the subpixels are different, if the control is performed in the same way as when using a display panel with subpixels having the same horizontal length, crosstalk occurs due to the horizontal positional deviation of the subpixels. If the width of the opening of the parallax barrier is narrowed in order to reduce the crosstalk, the aperture ratio is lowered, the luminosity factor is lowered, and the image becomes dark.

The image display device, image display system, and head-up display of the disclosure described below can appropriately display a three-dimensional image without reducing the brightness of the image when lengths of the subpixels in a parallax direction are different.

Hereinafter, embodiments of the disclosure will be described with reference to the drawings. The drawings used in the following description are schematic. The dimensional ratios on the drawings do not always match the actual ones.

[Image Display System Configuration]

Figure 1:
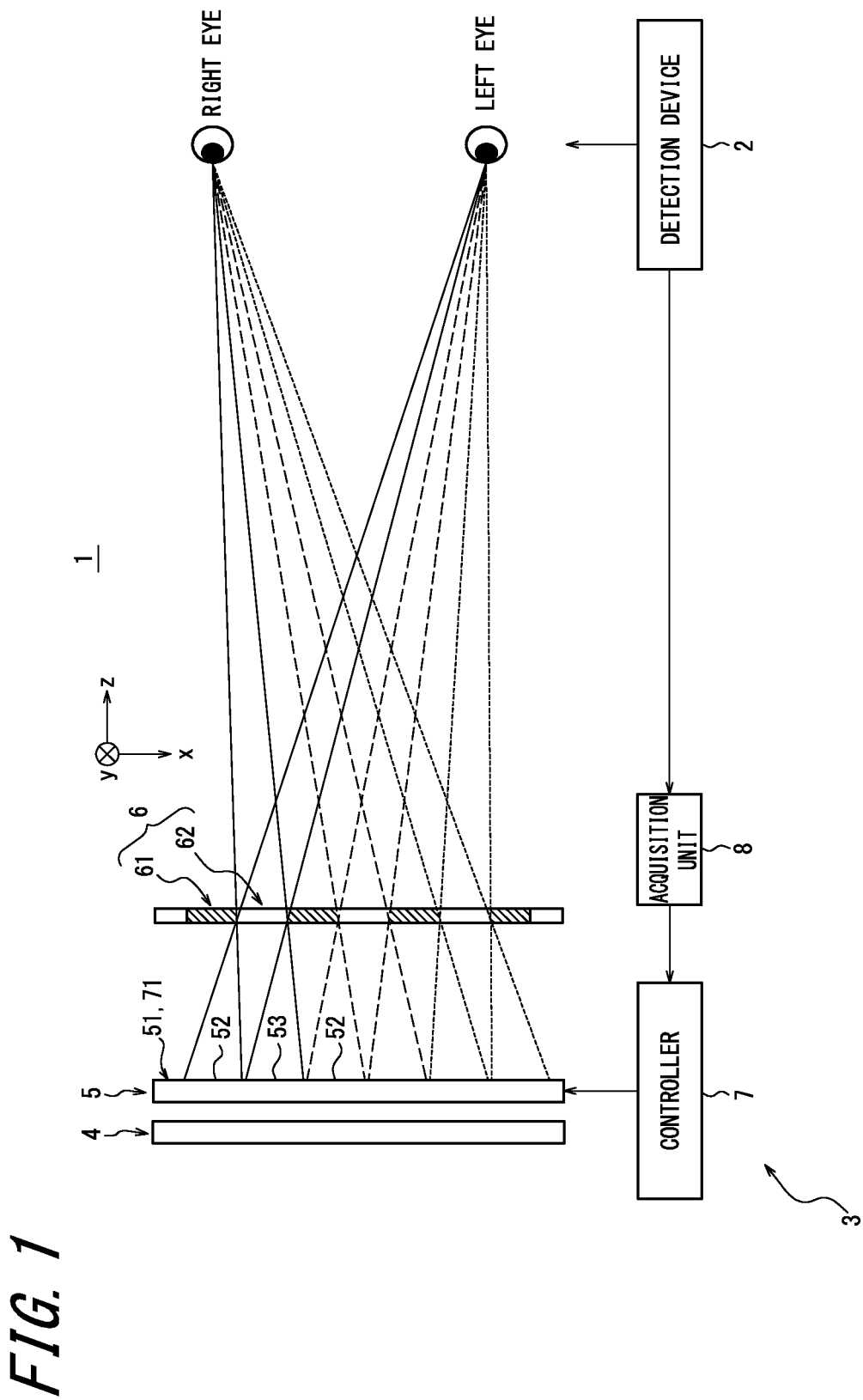
FIG. 1 is a schematic configuration diagram of an image display device according to one embodiment.

An image display system 1 according to one of a plurality of embodiments of the disclosure is configured to include a detection device 2 and an image display device 3 as shown in FIG. 1. FIG. 1 shows a state in which the image display system 1 is viewed from above a user who observes an image through the image display device 3.

(Detection Device)

The detection device 2 is configured to detect a position of a left eye (first position) of the user and a position of a right eye (second position) of the user and output the positions to the image display device 3. The detection device 2 may include, for example, a camera. The detection device 2 may be configured so that the user's face can be photographed by the camera. The detection device 2 may be configured to detect the position of at least one of the left eye and the right eye from the image photographed by the camera. The detection device 2 may be configured to detect the position of at least one of the left eye and the right eye as coordinates in three-dimensional space from an image photographed by one camera. The detection device 2 may be configured to detect the position of at least one of the left eye and the right eye as coordinates in three-dimensional space from images photographed by two or more cameras.

The detection device 2 may not include a camera, and may be connected to a camera outside the device. The detection device 2 may include an input terminal for inputting a signal from a camera outside the device. The camera outside the device may be directly connected to the input terminal. The camera outside the device may be indirectly connected to the input terminal via a network. The detection device 2 without a camera may include an input terminal into which the camera inputs a video signal. The detection device 2 without a camera may be configured to detect the position of at least one of the left eye and the right eye from the video signal input to the input terminal.

The detection device 2 may include, for example, a sensor. The sensor may be an ultrasonic sensor, an optical sensor, or the like. The detection device 2 may be configured to detect the position of the user's head by a sensor and detect the position of at least one of the left eye and the right eye based on the position of the head. The detection device 2 may be configured to detect the position of at least one of the left eye and the right eye as coordinates in three-dimensional space by one or more sensors.

The detection device 2 may be configured so that, when the position of one of the left eye and the right eye is detected, the position of the other eye is estimated from the information about an inter-eye distance of the user or the information about a general inter-eye distance. When the detection device 2 detects the position of one eye and estimates the position of the other eye, it is assumed that the positions of the left eye and the right eye have been detected.

(Image Display Device)

In one embodiment of the disclosure, the image display device 3 includes an irradiator 4, a display panel 5 as a display device, a parallax barrier 6 as an optical element, a controller 7, and an acquisition unit 8.

The irradiator 4 is configured to be arranged on one surface side of the display panel 5 and irradiate the display panel 5 surface-wise. The irradiator 4 is arranged on the side opposite to the user when viewed from the display panel 5. The irradiator 4 may be configured to include a light source, a light guide plate, a diffusion plate, a diffusion sheet, and the like. The irradiator 4 is configured to emit irradiation light from the light source and make the irradiation light uniform in the planar direction of the display panel 5 by the light guide plate, the diffusion plate, the diffusion sheet, or the like. The irradiator 4 is configured to emit uniform light toward the display panel 5.

As the display panel 5, a display panel such as a transmissive liquid crystal display panel can be adopted. In the present application, an area where an actual image of the display panel 5 is displayed is referred to as an active area 51. The display panel 5 is configured to display various images in the active area 51. In the disclosure, the active area 51 of the display panel 5 in the space visually perceived by the user is referred to as a display surface 71. When the user directly and visually perceives the active area 51 of the display panel 5 without a lens, concave mirror and/or convex mirror, or the like intervening between the user and the active area 51 of the display panel 5, the display surface 71 coincides with the position of the active area 51 of the display panel 5. When the user perceives the active area 51 of the display panel 5 as a virtual image, the display surface 71 coincides with the position of the virtual image of the active area 51 of the display panel 5. When the user perceives the active area 51 of the display panel 5 as a virtual image, the user visually perceives the active area 51 on the display surface 71 in the space where the display panel 5 has no substance.

Figure 2:
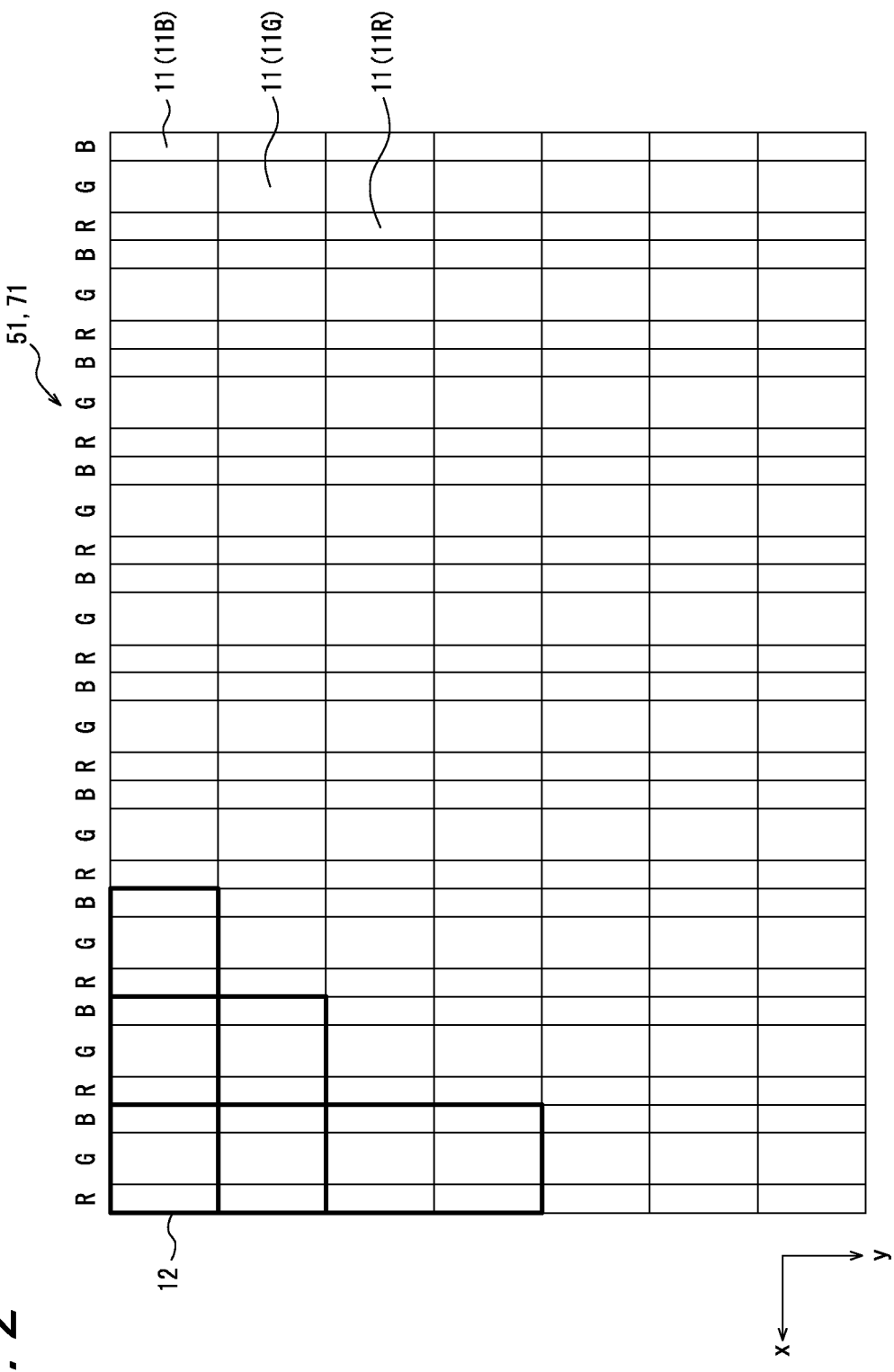
FIG. 2 is a diagram showing an example of the arrangement of subpixels on a display surface of a display panel.

The active area 51 of the display panel 5 includes a plurality of subpixels 11 arranged in a grid along a first direction (x direction) and a second direction (y direction) that intersects the first direction, as shown in FIG. 2. The second direction can be a direction substantially orthogonal to the first direction. In FIG. 2, the display surface 71 coincides with the active area 51. The first direction corresponds to the parallax direction that gives parallax to both eyes of the user. In the image display device 3 of the type in which the user directly looks at the display panel 5 in a normal seated or upright posture, the first direction can be a horizontal direction as seen by the user. The second direction can be a vertical direction as seen by the user. In the following, the first direction will be described as an x direction and the second direction as a y direction. In each drawing showing the display panel 5, the x direction is shown as a direction from right to left. The y direction is shown as a direction from top to bottom. The direction that is orthogonal to the x direction and the y direction and faces the user's eyes is referred to as the z direction.

In one embodiment, subpixels 11 are longer in the y direction than in the x direction. Each subpixel 11 corresponds to one of R (red (first color)), G (green (second color)), and B (blue). In the following, the subpixels 11 configured to emit light of each color of R, G, and B may be written as red subpixels 11R (first subpixels), green subpixels 11G (second subpixels), and blue subpixels 11B. When the lengths of the red subpixel 11R, the green subpixel 11G, and the blue subpixel 11B along the x direction are the first length, the second length, and the third length, respectively, the ratio of the first length, the second length, and the third length can be set arbitrarily. In the following description of the present embodiment, the ratio of the first length, the second length, and the third length is 1:2:1. A predetermined number of subpixels 11 can constitute a pixel 12. The three subpixels 11 of a red subpixel 11R, a green subpixel 11G, and a blue subpixel 11B can constitute one pixel 12 as a set. In FIG. 2, some pixels are highlighted by thick lines for explanation. One pixel 12 can be called one picture element. The length in the x direction and the length of the y direction of one pixel can be set to 1:1 but are not limited thereto. The x direction is, for example, the direction in which a plurality of subpixels 11 constituting one pixel 12 are arranged. The array of subpixels 11 in the x direction is appropriately called a "row". The y direction is, for example, the direction in which subpixels 11 of the same color are arranged. The array of subpixels 11 in the y direction is appropriately called a "column". In FIG. 2, R, G, and B displayed at the top for explanation indicate the color of the subpixel 11 in each column.

The display panel 5 is not limited to the transmissive display panel and other display panels such as a self-luminous display panel can also be used. The transmissive display panel includes a micro electro mechanical systems (MEMS) shutter type display panel in addition to the liquid crystal panel. The self-luminous display panel includes organic electro-luminescence (EL) and inorganic EL display panels. When a self-luminous display panel is used as the display panel 5, the irradiator 4 becomes unnecessary.

Figure 3:
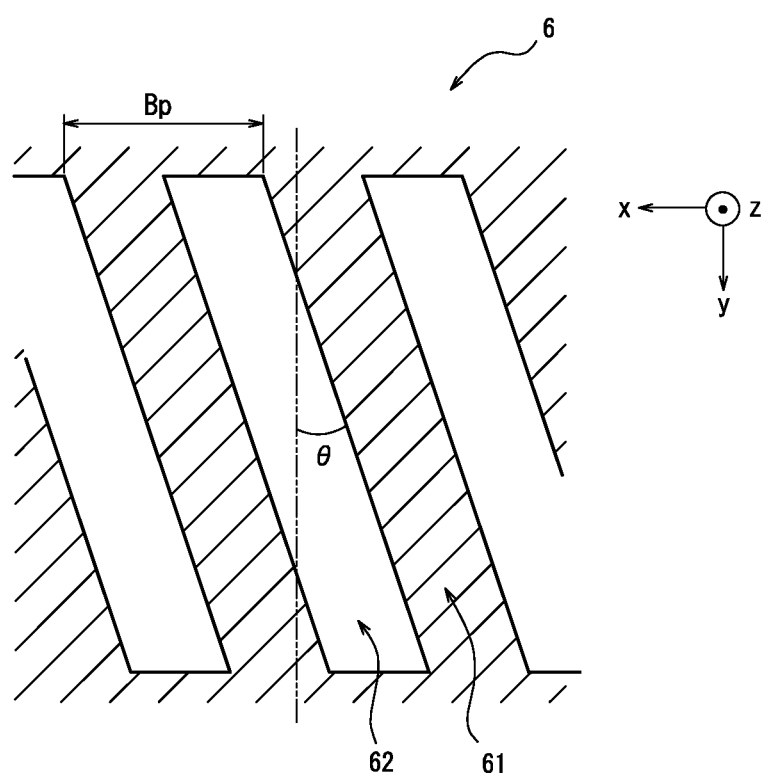
FIG. 3 is a diagram showing a configuration example of a parallax barrier.

The parallax barrier 6 is an optical element configured to define a light beam direction of image light emitted from each subpixel 11 of the display panel 5. The parallax barrier 6 includes, for example, a plurality of dimming regions 61 (optical components) and a plurality of light transmitting regions 62, as shown in FIG. 3. The plurality of dimming regions 61 and the plurality of light transmitting regions 62 may have a band shape (slit shape) extending in a predetermined direction. The dimming region 61 and the light transmitting region 62 of the parallax barrier 6 are arranged to face the display panel 5. The plurality of dimming regions 61 and the plurality of light transmitting regions 62 can be arranged alternately along the x direction. The plurality of dimming regions 61 have substantially the same width as each other and are arranged periodically in the x direction. The plurality of light transmitting regions 62 have substantially the same width as each other and are arranged periodically along the x direction. The width in the x direction of the light transmitting region 62 can be equal to or less than the width in the x direction of the dimming region 61. In the following description, it is assumed that the width in the x direction of the light transmitting region 62 is equal to the width in the x direction of the dimming region 61. Here, the parallax barrier 6 has a barrier aperture ratio of 50%. The barrier aperture ratio is the ratio of the width in the x direction of the light transmitting region 62 to the pitch in the x direction of the parallax barrier 6 (that is, the sum of the width in the x direction of the dimming region 61 and the width in the x direction of the light transmitting region 62). If the barrier aperture ratio is narrow, the image will be dark. The parallax barrier 6 determines the visible range of the image light emitted from the subpixel 11 for each of the left eye and the right eye. The parallax barrier 6 can be located on the side opposite to the irradiator 4 with respect to the display panel 5, as shown in FIG. 1. In another embodiment, the parallax barrier 6 can be located on the irradiator 4 side of the display panel 5.

The light transmitting region 62 is a portion where the light entering the parallax barrier 6 is transmitted. The light transmitting region 62 may transmit light with a transmittance of a first predetermined value or more. The first predetermined value may be, for example, approximately 100%, or may be a value less than 100%. The first predetermined value may be a value of 100% or less, for example, 80% or 50%, as long as the image light emitted from the active area 51 can be clearly seen. The dimming region 61 is a portion where the light entering the parallax barrier 6 is dimmed and hardly transmitted. In other words, the dimming region 61 is configured such that the image light emitted from the image displayed in the active area 51 of the display panel 5 is significantly reduced in the proportion reaching the user's eyes, or substantially blocked. The dimming region 61 may block light with a transmittance of a second predetermined value or less. The second predetermined value may be, for example, approximately 0%, or may be a value greater than 0% and close to 0%, such as 0.5%, 1%, or 3%. The first predetermined value may be several times or more, for example, 10 times or more, or 100 times or more larger than the second predetermined value.

As shown in FIG. 3, the light transmitting region 62 and the dimming region 61 are alternately arranged in a direction along an xy plane. The line indicating the boundary between the dimming region 61 and the light transmitting region 62 extends in a direction inclined at a predetermined angle θ to the y direction. The line indicating the boundary between the dimming region 61 and the light transmitting region 62 is also referred to as the boundary line between the dimming region 61 and the light transmitting region 62. The predetermined angle θ is also referred to as a barrier tilt angle. The barrier tilt angle θ may be greater than 0 degrees and less than 90 degrees. If the dimming region 61 and the light transmitting region 62 are aligned with the arrangement direction of the subpixels 11 along the y direction in FIG. 3, moire is easily recognized in the displayed image due to an error included in the arrangement of the subpixels 11 or the dimensions of the light transmitting region 62. If an extending direction (third direction) of the dimming region 61 and the light transmitting region 62 intersects the x and y directions in FIG. 3, moire is hardly recognized in the displayed image regardless of the error included in the arrangement of the subpixels 11 or the dimensions of the light transmitting region 62.

The parallax barrier 6 may be composed of a film or plate-like member having a transmittance of less than the second predetermined value. Here, the dimming region 61 is composed of the film or plate-shaped member. Here, the light transmitting region 62 is composed of openings provided in the film or plate-like member. The film may be made of resin or may be made of another material. The plate-shaped member may be made of resin, metal, or the like, or may be made of another material. The parallax barrier 6 is not limited to the film or plate-shaped member and may be composed of other types of members. The parallax barrier 6 may be composed of a base material having a dimming property. The parallax barrier 6 may be composed of a base material containing an additive having a dimming property. The parallax barrier 6 may have a structure in which a member having a dimming property is partially overlapped on a base material having a light-transmitting property. The parallax barrier 6 may have a structure in which a member having a dimming property is added to a part of a base material having a light-transmitting property.

The parallax barrier 6 may be composed of a liquid crystal shutter. The liquid crystal shutter is configured so that the light transmittance can be controlled according to the applied voltage. The liquid crystal shutter may be composed of a plurality of picture elements to control the light transmittance in each picture element. The liquid crystal shutter may be formed in any shapes in a region having a high light transmittance or a region having a low light transmittance. When the parallax barrier 6 is composed of a liquid crystal shutter, the light transmitting region 62 may be a region having a transmittance of the first predetermined value or more. When the parallax barrier 6 is composed of a liquid crystal shutter, the dimming region 61 may be a region having a transmittance of the second predetermined value or less. The parallax barrier 6 includes a shutter panel configured to be changeable between a light transmitting state and a dimmed state for each minute area. The shutter panel includes a micro electro mechanical system (MEMS) shutter panel using a MEMS shutter in addition to the liquid crystal shutter.

The controller 7 is configured to be connected to each component of the image display system 1 to control each component. The controller 7 is configured as, for example, a processor. The controller 7 may include one or more processors. The processor may include a general-purpose processor that reads a specific program and performs a specific function, and a dedicated processor specialized for a specific process. The dedicated processor may include application specific integrated circuits (ASICs). The processor may include a programmable logic device (PLD). The PLD may include a field-programmable gate array (FPGA). The controller 7 may be either a system-on-a-chip (SoC) or a system in a package (SiP) in which one or more processors cooperate. The controller 7 may include a storage unit, and the storage unit may store various information, a program for operating each component of the image display system 1, and the like. The storage unit may be composed of, for example, a semiconductor memory or the like. The storage unit may function as a work memory of the controller 7.

The acquisition unit 8 is configured to acquire information about the position of the left eye and the position of the right eye from the detection device 2 and deliver the information to the controller 7. The acquisition unit 8 includes an input terminal that receives an input from the detection device 2. The input terminal includes an electric connector corresponding to transmission by an electric signal and an optical connector corresponding to transmission by an optical signal. The controller 7 is configured to control the image displayed for each subpixel 11 included in the plurality of subpixels 11 of the display panel 5 based on the position of the left eye and the position of the right eye acquired by the acquisition unit 8. The image display method by the controller 7 will be described below.

[Method of Displaying Three-Dimensional Image]

Figure 4:
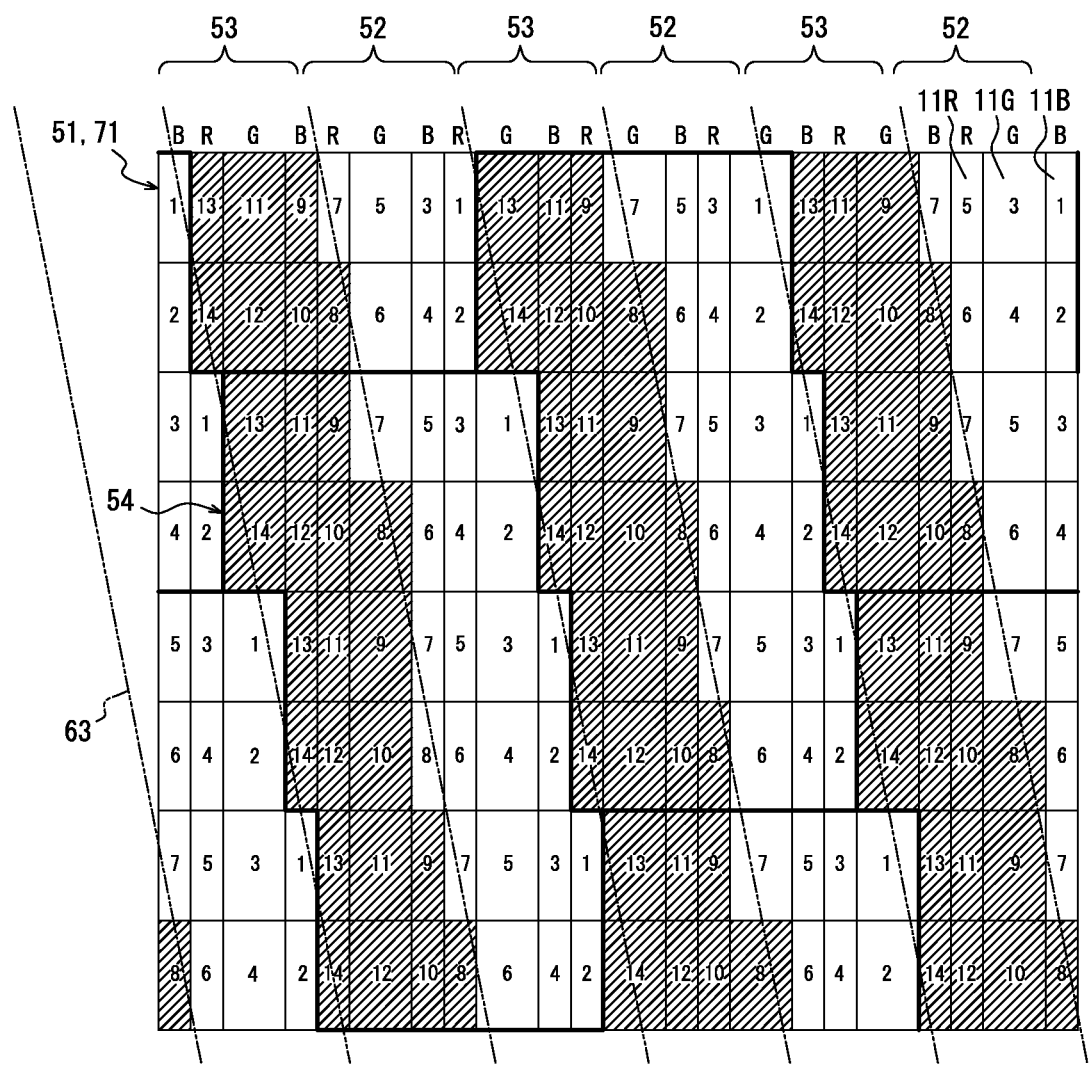
FIG. 4 is a diagram showing a first example of a group of subpixels on the display panel.

A method of displaying a three-dimensional image on the active area 51 of the display panel 5 will be described with reference to FIG. 4. In FIG. 4, a contour line 63 of the parallax barrier 6 seen from the user's left eye (first eye) is shown by a chain double-dashed line on the active area 51 for explanation. That is, the contour line 63 of the parallax barrier 6 shown in FIG. 4 is that the parallax barrier 6 is projected onto the active area 51 from a point at an optimal viewing distance where the left eye of the user is located. In the present application, "projection" means a figure that is formed by connecting all points on an object from a reference point outside the target object with a straight line along an optical path and connecting the intersections of those straight lines and the plane on which the object is projected. "Project" means to form a projection of the object on a plane. When there is an optical element such as a lens or mirror between the reference point and the plane on which the object is projected, the straight line connecting the reference point and the point on the object is along the optical path refracted or deflected by the optical effect of the optical element.

The image light emitted from the active area 51 of the display panel 5 and transmitted through the light transmitting region 62 of the parallax barrier 6 reaches the user's eyes. The left eye of the user can visually recognize a first region 52 on the active area 51 as a band-shaped area corresponding to the light transmitting region 62. The image light emitted from a second region 53 on the active area 51 corresponding to the dimming region 61 of the parallax barrier 6 is dimmed before reaching the left eye of the user. The left eye of the user can hardly visually recognize the second region 53 on the active area 51 corresponding to the dimming region 61.

On the other hand, as can be seen from FIG. 1, in the image display system 1, when viewed from the right eye (second eye) of the user, the user can visually recognize the second region 53 on the active area 51 through the light transmitting region 62. The image light is blocked by the dimming region 61 of the parallax barrier 6, so that the right eye of the user cannot visually recognize the first region 52 on the active area 51.

By displaying an image having parallax in the first region 52 visible from the left eye and the second region 53 visible from the right eye, images to be recognized as three-dimensional images with respect to the user's field of view can be displayed. Hereinafter, the image to be projected on the left eye is referred to as a left eye image (first image), and the image to be projected on the right eye is referred to as a right eye image (second image). As described above, the plurality of light transmitting regions 62 of the parallax barrier 6 are configured to transmit the left eye image displayed in the first region 52 in the direction of the optical path toward the left eye of the user. The plurality of light transmitting regions 62 of the parallax barrier 6 are configured to transmit the right eye image displayed in the second region 53 in the direction of the optical path toward the right eye of the user.

The controller 7 is configured to switch an image displayed for each subpixel 11 between the left eye image and the right eye image, according to the positions of the left and right eyes of the user and the configurations of the display panel 5 and the parallax barrier 6. The controller 7 is configured to determine whether the image displayed for each subpixel 11 is a left eye image or a right eye image, according to the positions of the left and right eyes of the user and the configurations of the display panel 5 and the parallax barrier 6. The controller 7 is configured to be able to determine the subpixel 11 for displaying the left eye image and the subpixel 11 for displaying the right eye image from the plurality of subpixels 11. The subpixel 11 that entirely belongs to the first region 52 is controlled to display the left eye image. The subpixel 11 that entirely belongs to the second region 53 is controlled to display the right eye image. If the subpixel 11 that partially belongs to the first region 52 and partially belongs to the second region 53 is concerned with the first region 52 more than the second region 53, the subpixel 11 is controlled to display the left eye image. If the subpixel 11 that partially belongs to the first region 52 and partially belongs to the second region 53 is concerned with the second region 53 more than the first region 52, the subpixel 11 is controlled to display the right eye image.

The controller 7 is configured to control a plurality of subpixels 11 belonging to the same group 54 as one control unit. In FIG. 4, the outer circumference of the group 54 is highlighted by a thick line for explanation. The group 54 is the smallest group of multiple subpixels 11 having the same arrangement pattern for the subpixels 11 displaying the left eye image and the subpixels 11 displaying the right eye image. The controller 7 is configured so that the entire image can be regularly reconstructed by repeatedly arranging the subpixels 11 of the group 54 arranged in the same arrangement pattern two-dimensionally on the active area 51. The display of the left eye image and the right eye image of each subpixel 11 can be controlled based on the group 54.

One group 54 includes a plurality of subpixels 11. In each group 54, the subpixel 11 displaying the left eye image and the subpixel 11 displaying the right eye image are arranged in the same positional relationship between different groups. In each group 54, the red subpixel 11R, the green subpixel 11G, and the blue subpixel 11B are arranged in the same positional relationship. In the active area 51, the plurality of groups 54 are arranged periodically in the x direction and the y direction. The controller 7 is configured to be able to determine the subpixel 11 for displaying the left eye image and the subpixel 11 for displaying the right eye image in the same arrangement pattern for the subpixel groups of all the groups 54. The controller 7 is configured to simultaneously switch the display of the subpixels 11 located at the corresponding positions between the left eye image and the right eye image in all the groups 54. A first example of a method of arranging the subpixel 11 for displaying the left eye image and the subpixel 11 for displaying the right eye image according to one embodiment will be described with reference to FIG. 4.

First Example of Group of Subpixels

In FIG. 4, each of the subpixels 11 included in the same group 54 is numbered 1 to 14 for each of the red subpixel 11R, the green subpixel 11G, and the blue subpixel 11B. In FIG. 4, the color of the pixel is indicated by the sign of R, G, and B shown at the top of the column of each subpixel 11 as in FIG. 2. In the following description, the individual red subpixels 11R of each group 54 are described as the red subpixels 11R of numbers r1 to r14 having an "r" in front of the number to distinguish the red subpixels 11R from the subpixels 11 of other colors. Similarly, the green subpixel 11G will be described as the green subpixels 11G of numbers g1 to g14 with a "g" in front of the number. The blue subpixel 11B will be described as the blue subpixels 11B of numbers b1 to b14 with a "b" in front of the number.

FIG. 4 is a diagram showing a state when the user's eyes are located at the reference position with respect to the display panel 5. Each of the subpixels 11 of the numbers r1 to r7, g1 to g7, and b1 to g7 in FIG. 4 displays the left eye image because half or more of the area belongs to the first region 52. Each of the subpixels 11 of the numbers r8 to r14, g8 to g14, and b8 to b14 in FIG. 4 displays the right eye image because half or more of the area belongs to the second region 53. In the subsequent drawings, the subpixels 11 that display the left eye image are shown without shading. The subpixels 11 that display the right eye image are shaded.

The numbers of red subpixels 11R, green subpixels 11G, and blue subpixels 11B belonging to the group 54 can be represented by 2n (n is a natural number), respectively. In the example of FIG. 2, n=7. Here, the group 54 includes 6n, that is, 42 subpixels 11. It can be said that 2n is the number of pixels 12 contained in the group.

In the example of FIG. 4, the group 54 extends over an array (rows) of a plurality of subpixels 11 arranged in the x direction and an array (columns) of a plurality of subpixels 11 arranged in the y direction on the active area 51. In FIG. 4, the subpixel group of the group 54 extends over a plurality of rows and a plurality of columns. In FIG. 4, the subpixel groups of adjacent groups 54 are arranged to be offset in the x direction and the y direction.

(Procedure for Switching Between Left Eye Image and Right Eye Image)

The controller 7 in FIG. 1 is configured to determine an image to be displayed in the subpixel 11 belonging to the group 54 is as either a left eye image or a right eye image according to the eye positions of both eyes of the user detected by the detection device 2. In the example of FIG. 4, the red subpixels 11R of numbers r1 to r7, the green subpixels 11G of numbers g1 to g7, and the blue subpixels 11B of numbers b1 to b7 are the subpixels 11 that display the left eye image. The red subpixels 11R of numbers r8 to r14, the green subpixels 11G of numbers g8 to g14, and the blue subpixels 11B of numbers b8 to b14 are the subpixels 11 that display the right eye image.

FIGS. 5 to 12 are diagrams illustrating the change of the image displayed by each subpixel 11 of the group 54 when the position of the parallax barrier 6 as seen from the eyes of the user located at an optimal viewing distance is sequentially displaced from the position of FIG. 4 to the negative side in the x direction (direction of the arrow). In FIGS. 5 to 12, the position of the parallax barrier 6 is indicated by the contour line 63 of the parallax barrier 6. Such displacement of the parallax barrier 6 can occur when the user's eyes move relatively to the left with respect to the image display device 3. As the contour lines 63 are displaced, the first region 52 and the second region 53 sandwiched between the contour lines 63 are displaced.

Figure 5:
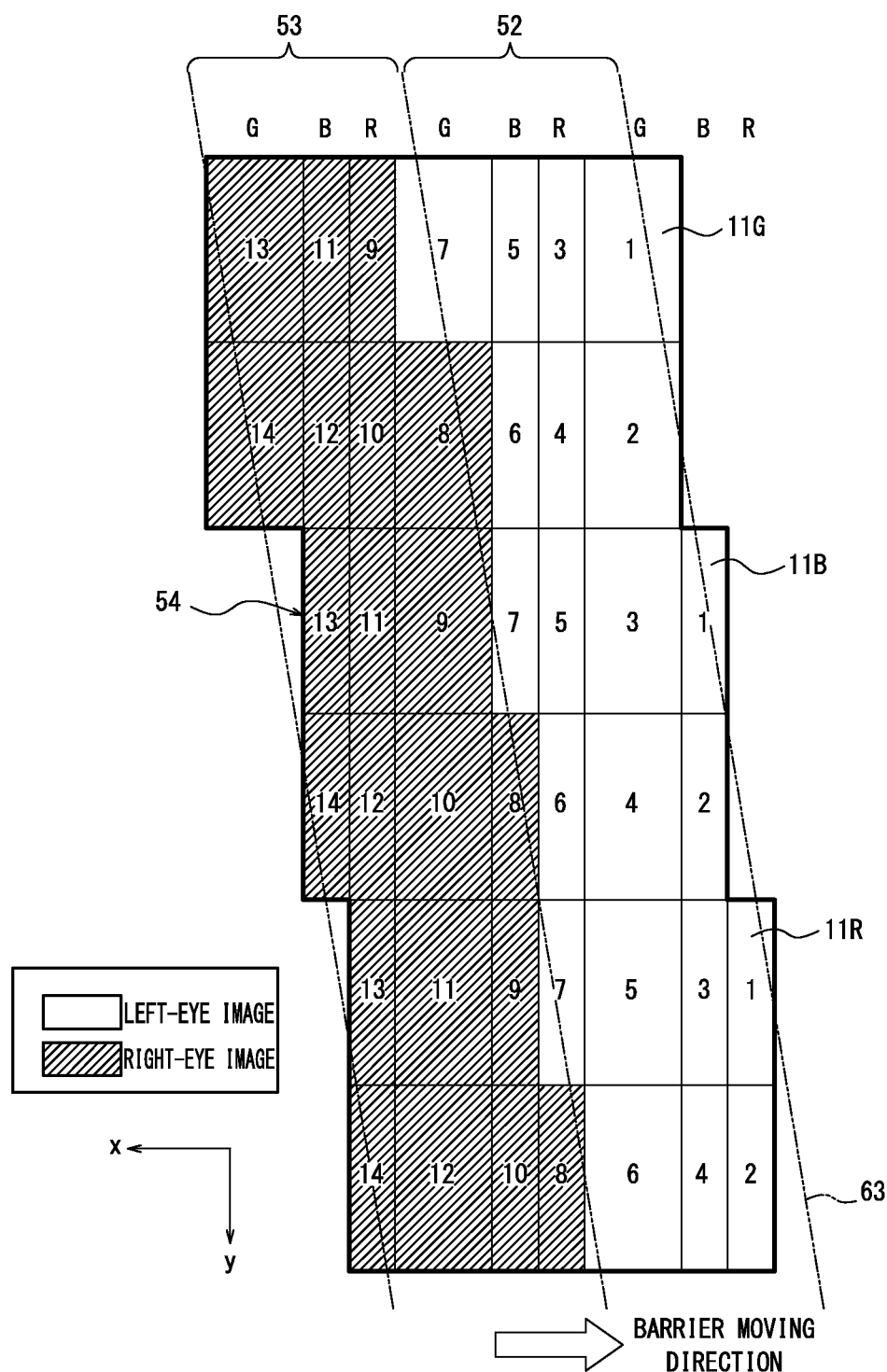
FIG. 5 is a diagram illustrating the switching of a display area in the group of FIG. 4.

FIG. 5 shows an array of subpixels 11 that display the left eye image and the right eye image when the left eye and the right eye of the user are located at the same reference positions as in FIG. 4.

Figure 6:
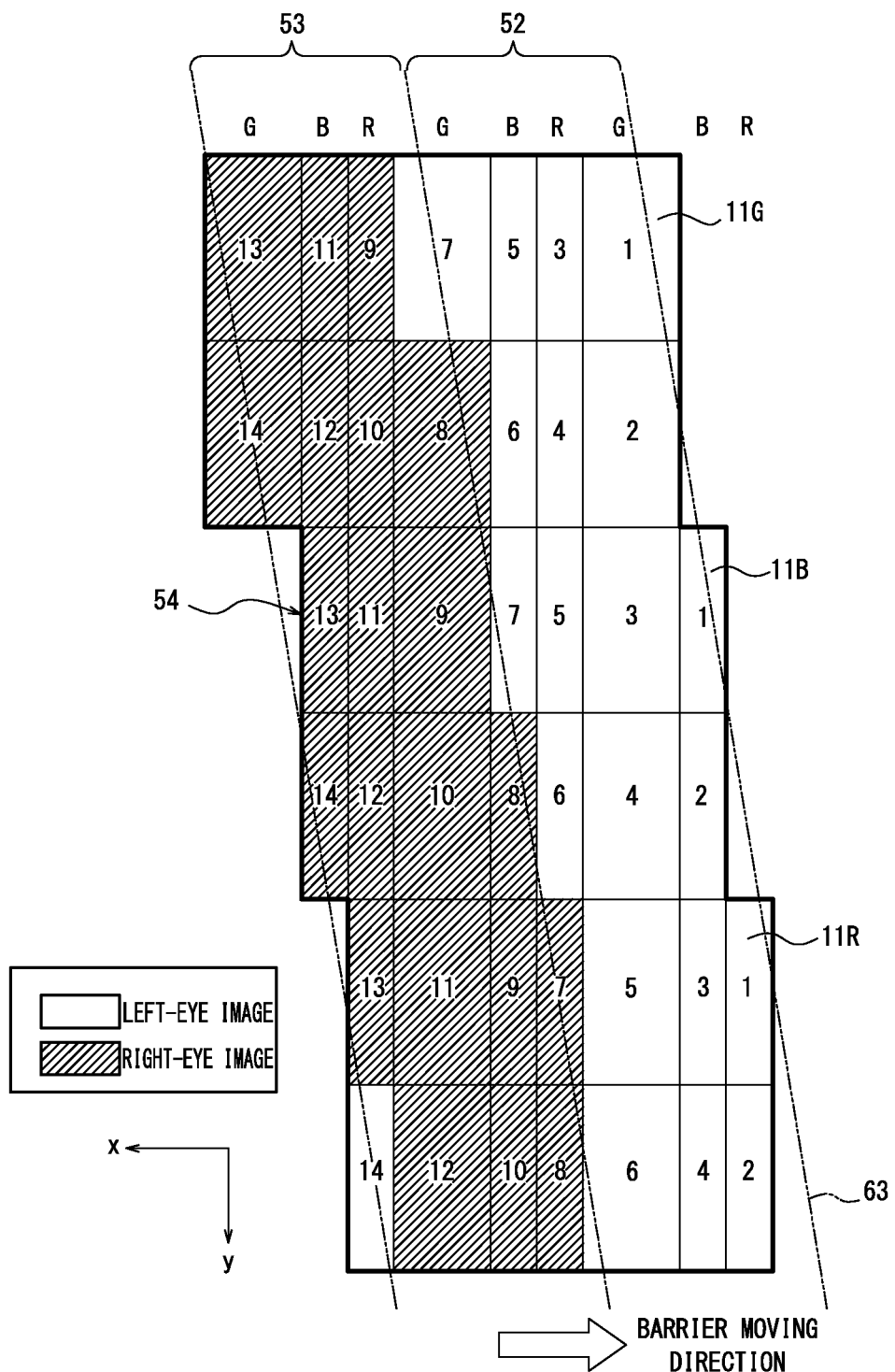
FIG. 6 is a diagram illustrating the switching of the display area in the group of FIG. 4.

FIG. 6 shows a state in which the position of the parallax barrier 6 seen from the user's eyes is displaced from the state of FIG. 5 and the first subpixel 11 is switched. In FIG. 6, the image displayed by the red subpixel 11R of number r7 is changed from the left eye image to the right eye image. At the same timing as the image displayed by the red subpixel 11R of number r7 changes, the image displayed by the red subpixel 11R of number r14 is changed from the right eye image to the left eye image. As such, in the subpixel groups of all the groups 54, the display of the right eye image and the left eye image is switched between the red subpixels 11R of number r7 and number r14. Since the two subpixels 11 of the same color are switched between the display of the left eye image and the display of the right eye image at the same timing, the color flicker of the entire display image can be reduced.

Figure 7:
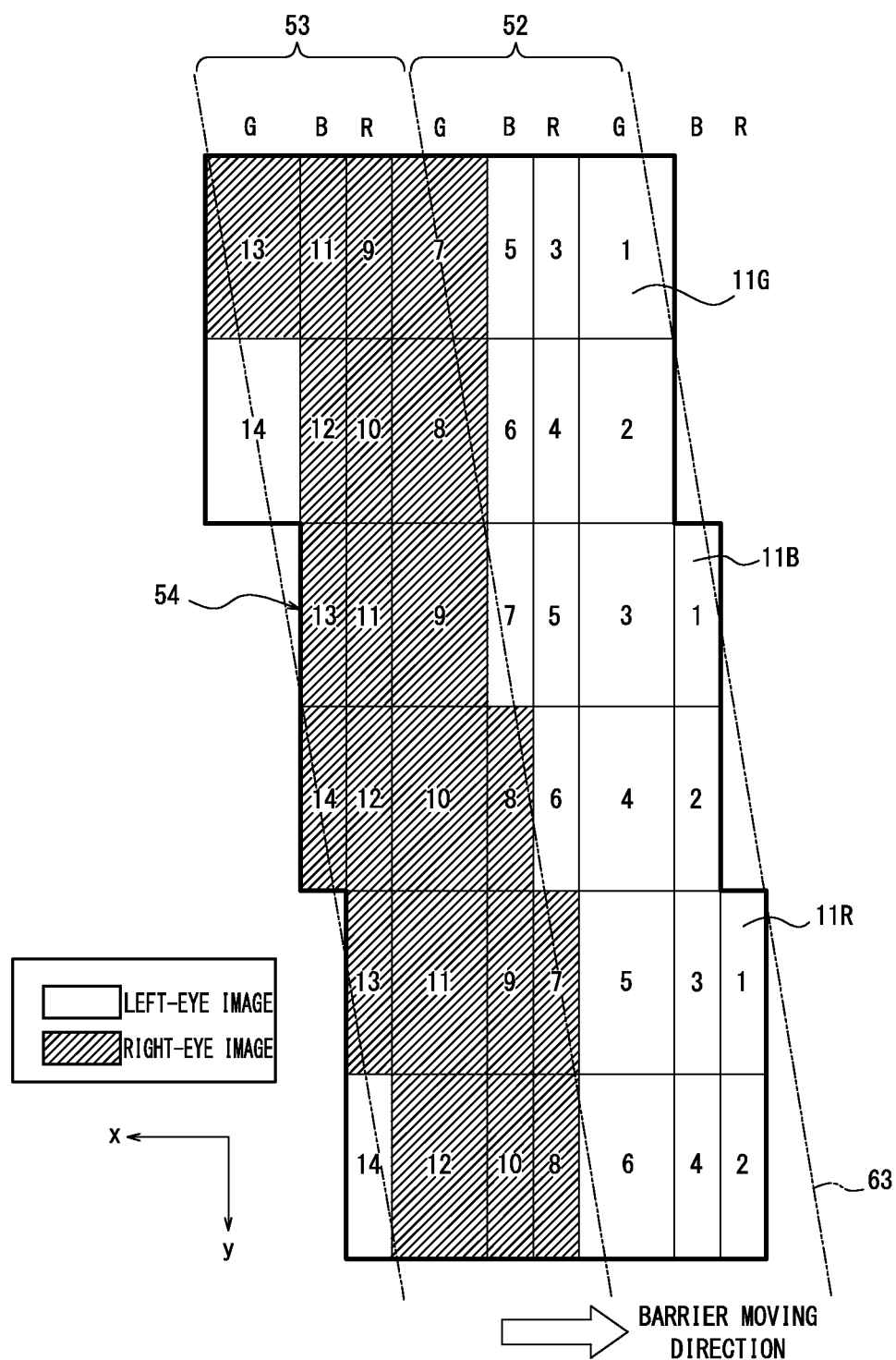
FIG. 7 is a diagram illustrating the switching of the display area in the group of FIG. 4.
Figure 8:
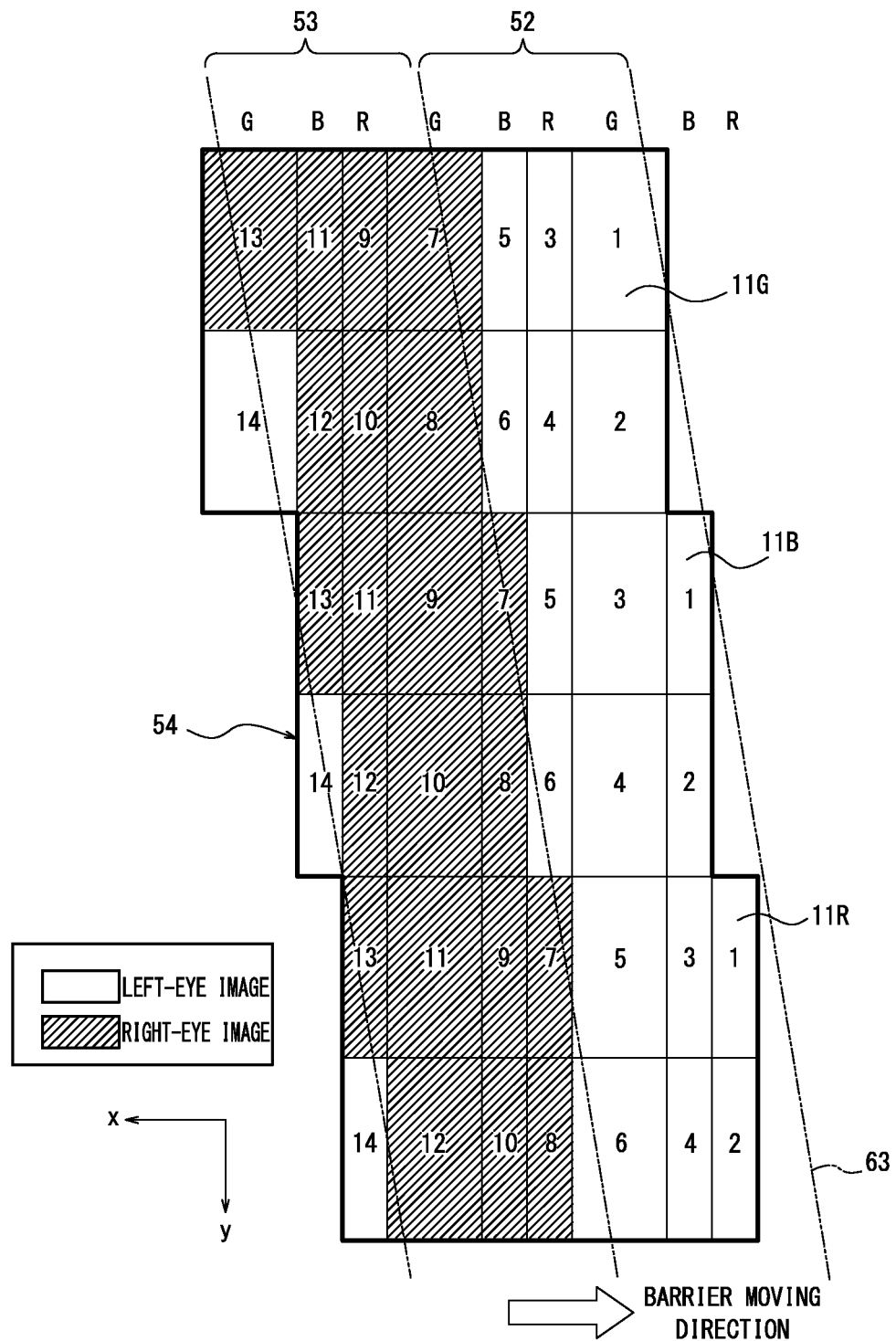
FIG. 8 is a diagram illustrating the switching of the display area in the group of FIG. 4.

In FIGS. 7 and 8, the position of the parallax barrier 6 as seen from the user's eyes is further displaced to the negative side in the x direction (direction of the arrow). Accordingly, as shown in FIG. 7, the image displayed by the green subpixel 11G of number g7 is changed from the left eye image to the right eye image. At the same timing as the image displayed by the green subpixel 11G of number g7 changes, the image displayed by the green subpixel 11G of number g14 changes from the right eye image to the left eye image. As shown in FIG. 8, the image displayed by the blue subpixel 11B of number b7 is changed from the left eye image to the right eye image. At the same timing as the image displayed by the blue subpixel 11B of number b7 changes, the image displayed by the blue subpixel 11B of number b14 changes from the right eye image to the left eye image.

Figure 9:
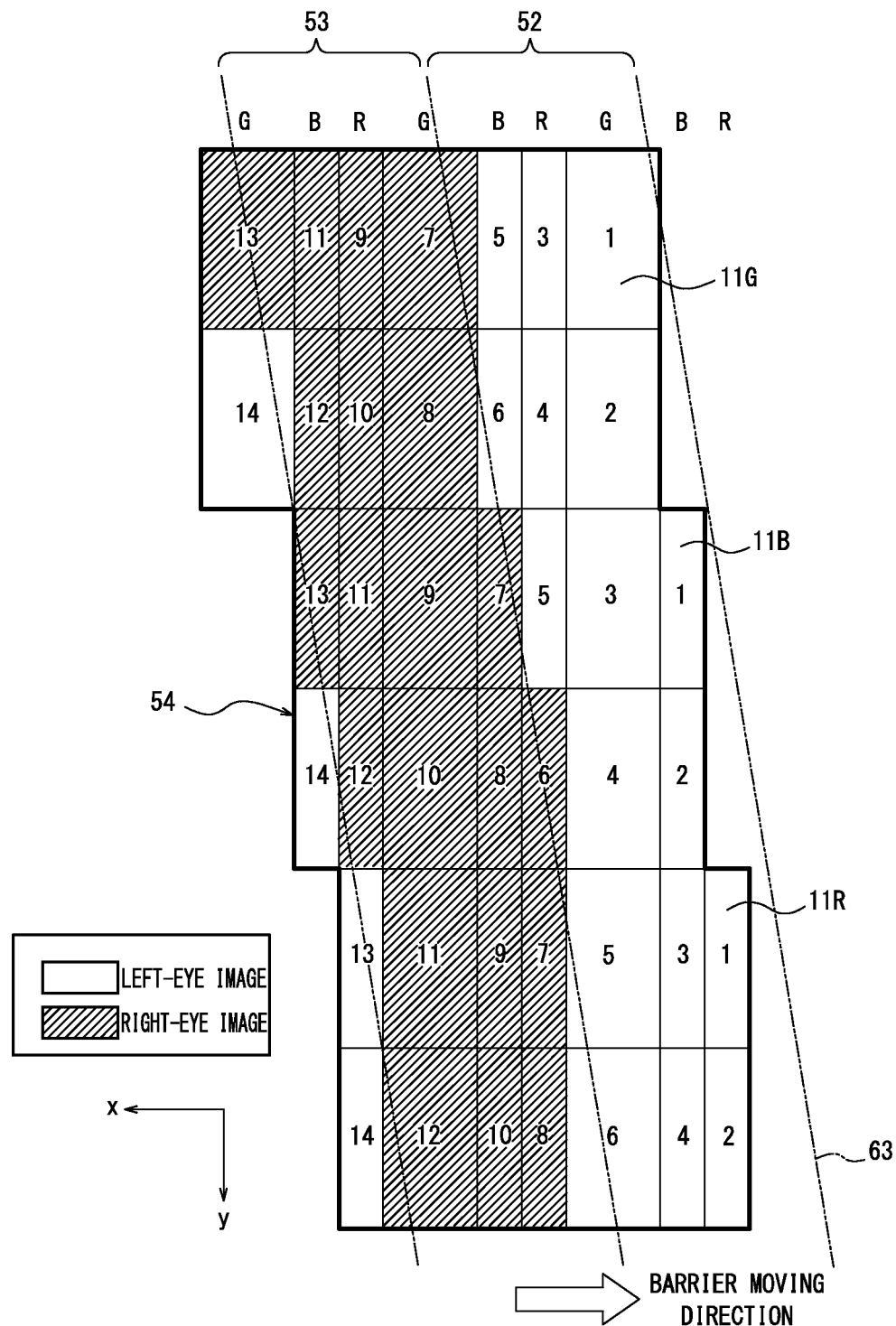
FIG. 9 is a diagram illustrating the switching of the display area in the group of FIG. 4.
Figure 10:
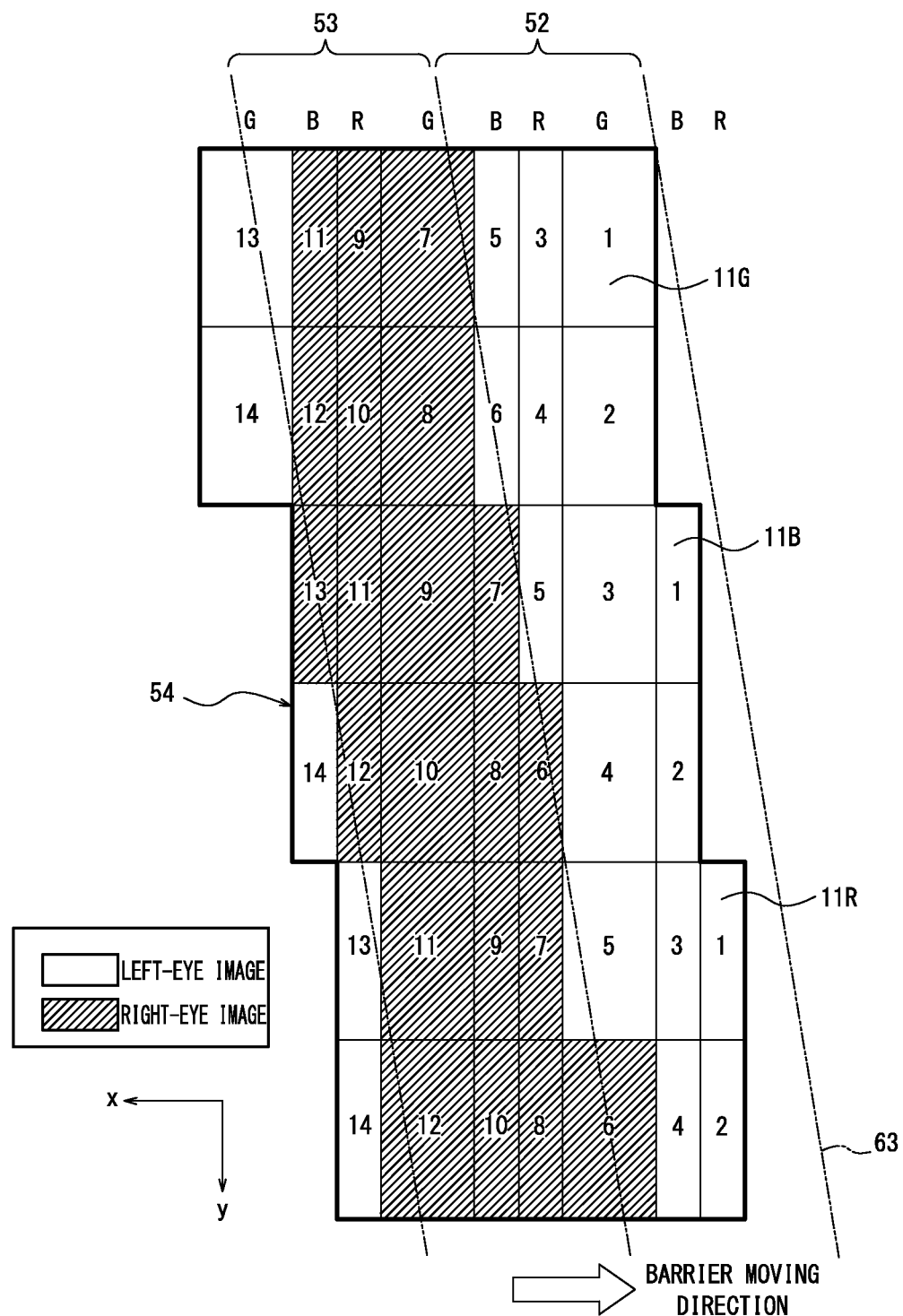
FIG. 10 is a diagram illustrating the switching of the display area in the group of FIG. 4.
Figure 11:
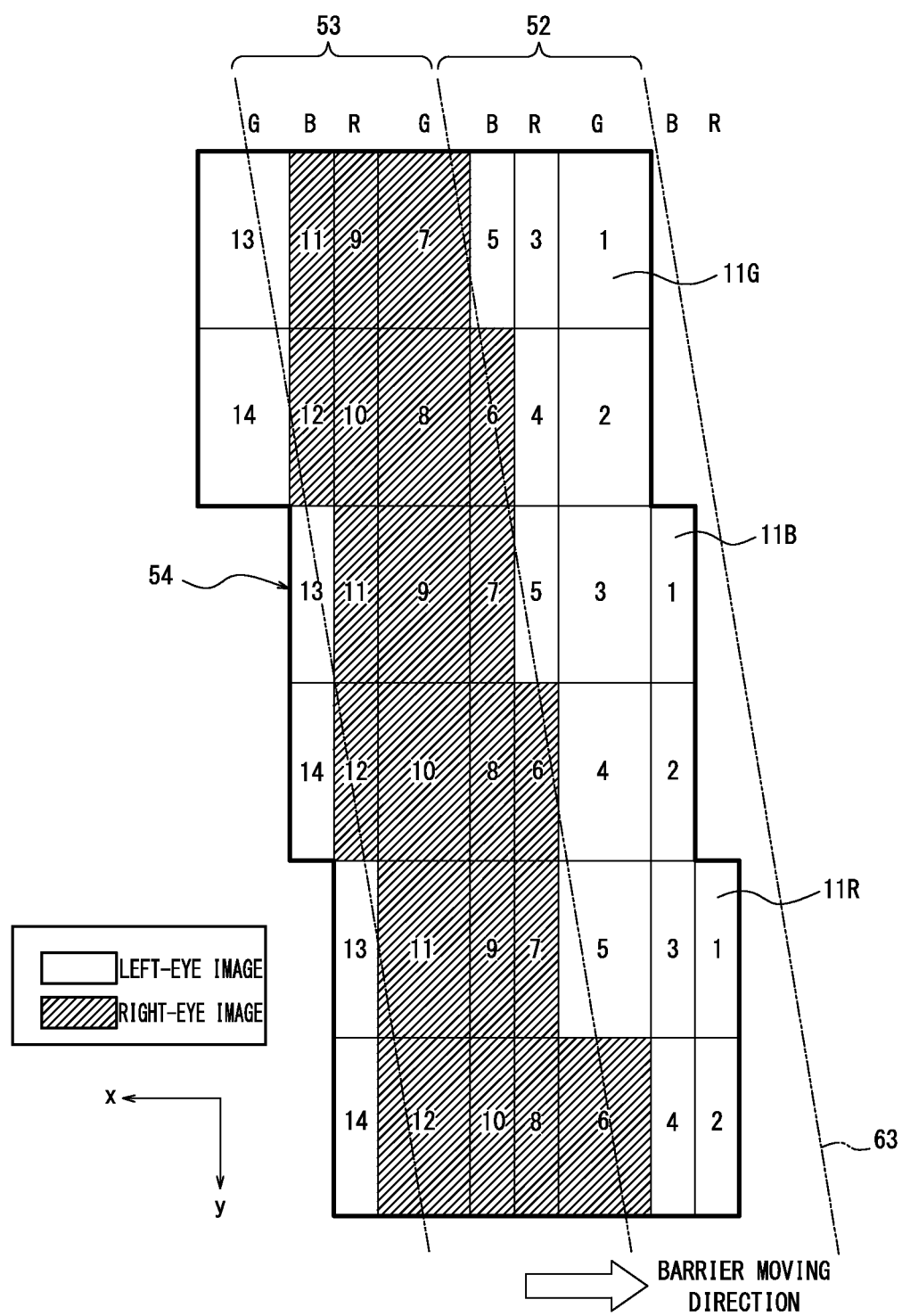
FIG. 11 is a diagram illustrating the switching of the display area in the group of FIG. 4.

In FIGS. 9 to 11, the position of the parallax barrier 6 is sequentially further displaced to the negative side in the x direction. Accordingly, first, as shown in FIG. 9, the display of the left eye image and the right eye image is switched between the two red subpixels 11R of numbers r6 and r13. Next, as shown in FIG. 10, the display of the left eye image and the right eye image is switched between the two green subpixels 11G of numbers g6 and g13. As shown in FIG. 11, the display of the left eye image and the right eye image is switched between the two blue subpixels 11B of numbers b6 and b13.

Figure 12:
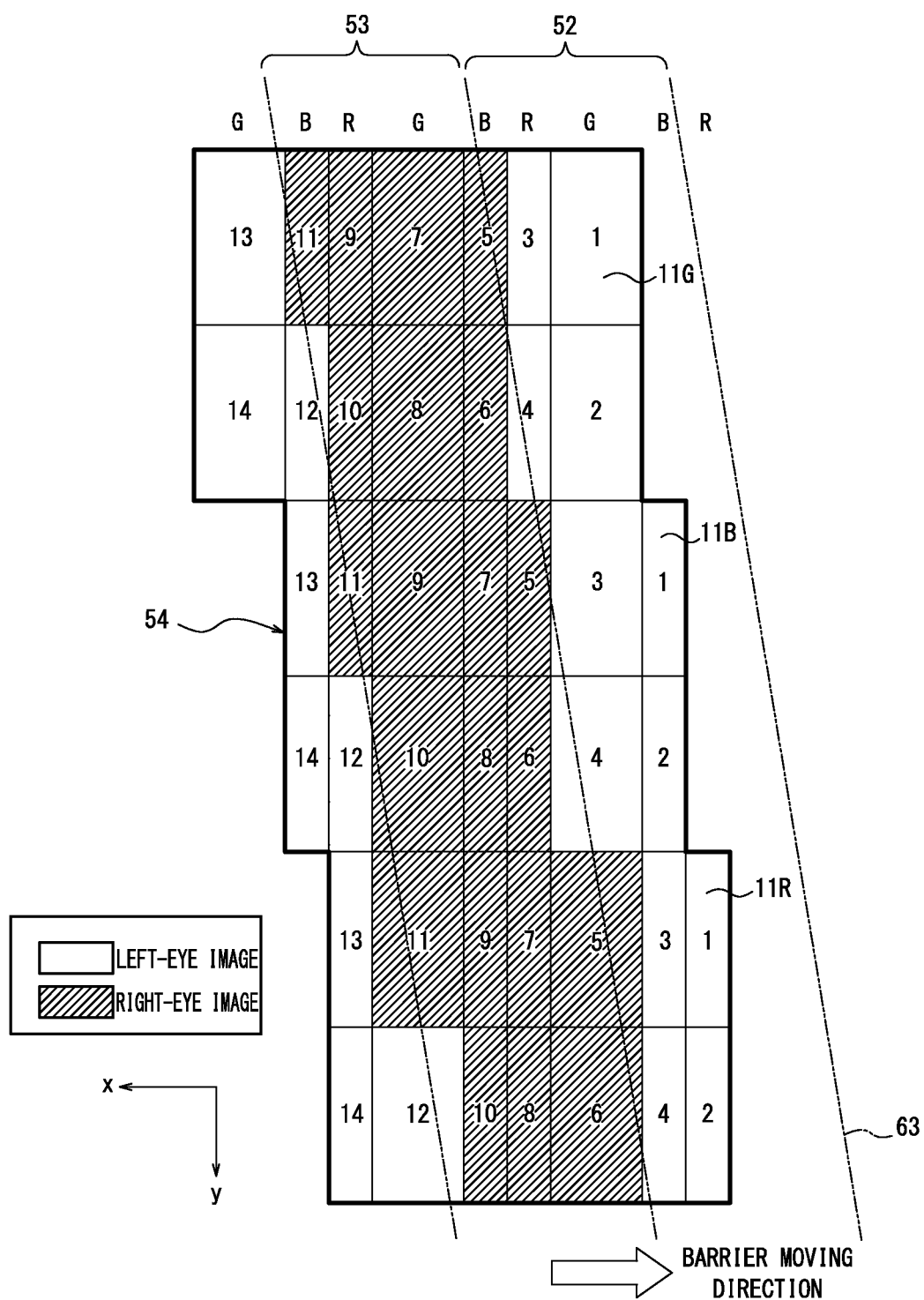
FIG. 12 is a diagram illustrating the switching of the display area in the group of FIG. 4.

FIG. 12 shows a state in which the parallax barrier 6 is further displaced. The display of the left eye image and the right eye image is sequentially switched between the red subpixels 11R of numbers r5 and r12, between the green subpixels 11G of numbers g5 and g12, and between the blue subpixels 11B of numbers b5 and b12. When the parallax barrier 6 is further displaced, the display image is switched between similar subpixels. As a result, even if the positions of the user's eyes change, the display panel 5 can continue to display the stereoscopic image to the user.

As described above, the controller 7 is configured to control a plurality of subpixels 11 including the red subpixels 11R, the green subpixels 11G, and the blue subpixels 11B included in the group 54 as the group 54. The controller 7 is configured so that, when the image displayed by one red subpixel 11R belonging to the group 54 is changed from the left eye image to the right eye image, the image displayed by another red subpixel 11R belonging to the same group 54 is changed from the right eye image to the left eye image. The same applies when changing the images displayed by the green subpixels 11G and the blue subpixels 11B. The controller 7 is configured to switch the subpixels 11 represented by the same numbers between the left eye image and the right eye image at the same timing in all the groups 54.

As described above, a first timing when the controller 7 changes the image displayed by the red subpixel 11R between the left eye image and the right eye image may be different from a second timing for changing the image displayed by the green subpixel 11G between the left eye image and the right eye image. A third timing for changing the image displayed by the blue subpixel 11B between the left eye image and the right eye image may be different from the first timing and the second timing. The widths in the x direction of the red subpixel 11R, the green subpixel 11G, and the blue subpixel 11B are not equal. Therefore, the positions where the display images of the red subpixel 11R, the green subpixel 11G, and the blue subpixel 11B are switched with respect to the apparent displacement of the parallax barrier 6 are not the same. The apparent displacement of the parallax barrier 6 corresponds to the amount of displacement of the user's head.

On the other hand, the red subpixels 11R are arranged at equal intervals in the x direction with a pitch of 1 pixel. Therefore, the red subpixel 11R can be controlled based on the displacement amount of the user's head from the switching origin with reference to the switching origin independent of the green subpixel 11G and the blue subpixel 11B. The same applies to the green subpixel 11G and the blue subpixel 11B.

Figure 13:
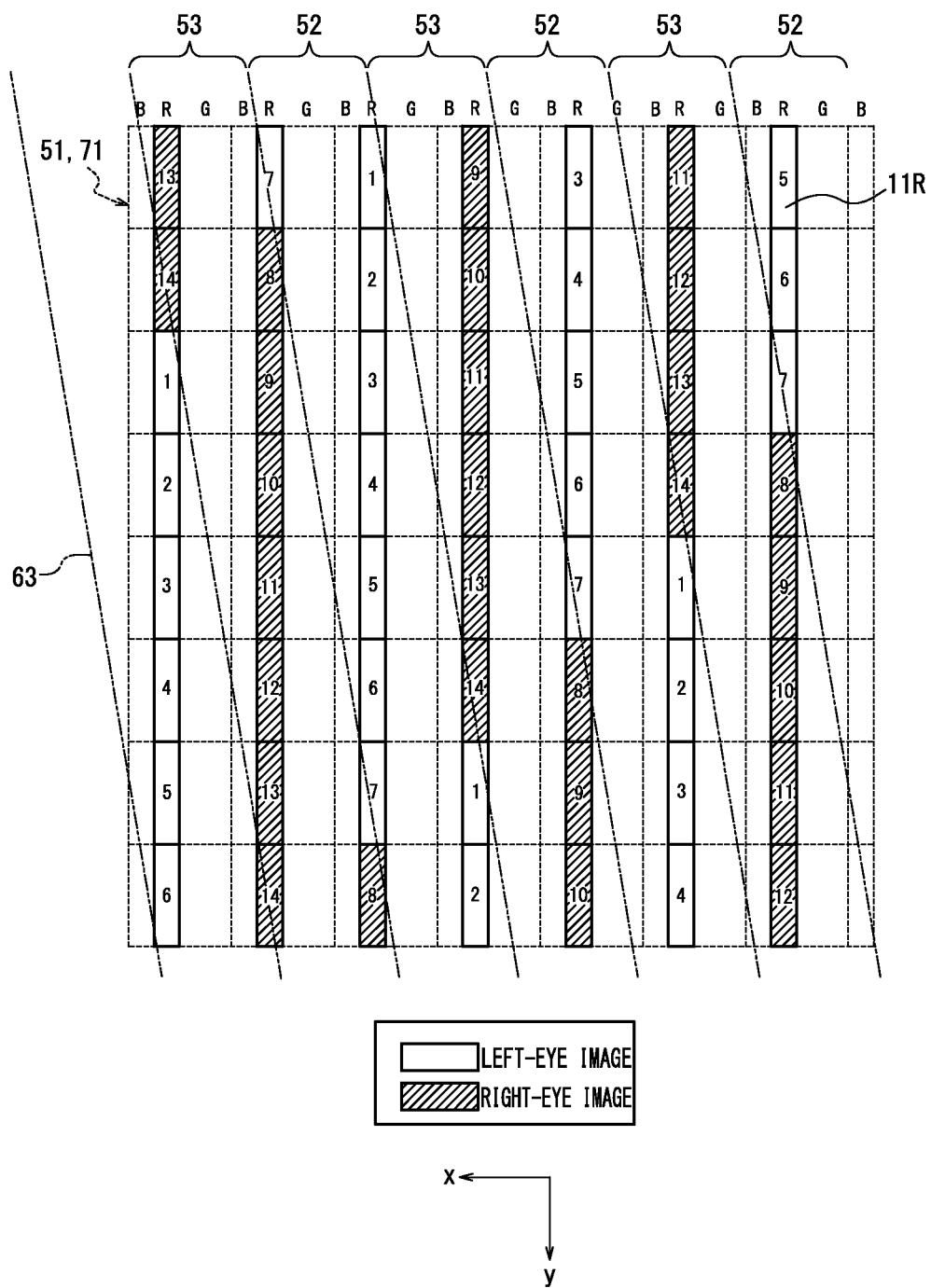
FIG. 13 is a diagram illustrating a method of determining the switching timing of an R pixel.

The switching origin can be adjusted for each color of subpixels 11. For example, a method of adjusting the switching origin of the red subpixel 11R will be described with reference to FIG. 13. First, the controller 7 displays all the green subpixel 11G and the blue subpixel 11B in black. The black display is the display of the lowest brightness gradation of the subpixel 11. In FIG. 13, the outline of the subpixel 11 displayed in black is shown by a broken line. Next, the image for the left eye is displayed in the red subpixels 11R of numbers r2 to r7 and the image for the right eye is displayed in the red subpixels 11R of numbers r9 to r14. Here, the user adjusts the position of the head in the x direction while mutually switching the image to be displayed on the red subpixel 11R of number r1 and the red subpixel 11R of number r8 between the left eye image and the right eye image. The position where no change is observed in the displayed image by switching can be used as the reference position.

In the same manner as the red subpixel 11R, the user can adjust the reference positions of the green subpixel 11G and the blue subpixel 11B in the state where the subpixels 11 of other colors are displayed in black. The information about the reference positions can be stored in the storage unit of the controller 7. The controller 7 is configured to be able to independently control the switching between the left eye image and the right eye image for each of the red subpixel 11R, the green subpixel 11G, and the blue subpixel 11B based on the respective switching origins. As a result, the image displayed in the subpixel 11 can be switched between the left eye image and the right eye image regardless of the difference in lengths of the red subpixel 11R, the green subpixel 11G, and the blue subpixel 11B along the x direction.

[Design Method for Parallax Barrier and Group Arrangement]

In FIGS. 4 to 13, the controller 7 sets 14 red subpixels 11R, 14 green subpixels 11G, and 14 blue subpixels 11B as one group 54 and switches the image displayed in each subpixel 11 between the left eye image and the right eye image. However, the image display device 3 of the disclosure can adopt the configuration including the group 54 having the other arrangement pattern of subpixels 11, and the parallax barrier 6 corresponding to the group 54. The design method of the parallax barrier 6 and the arrangement method of the subpixels 11 of the group 54 will be described below with reference to FIG. 14.

It is assumed that the pitch in the x direction (horizontal pitch) of the pixel 12 on the active area 51 is Hp, the pitch in the y direction (vertical pitch) is Vp, the barrier tilt angle of the parallax barrier 6 projected on the active area 51 is θ, and the image pitch on the active area 51 is k. The barrier tilt angle θ is the tilt angle of the parallax barrier 6 projected onto the active area 51 from the position of the user's eyes located at an optimal viewing distance. More specifically, the barrier tilt angle θ is the angle of a direction in which the projection on the active area 51 of the light transmitting region 62 and the dimming region 61 extends, with respect to the y direction. The image pitch k is the pitch in the x direction of the dimming region 61 and the light transmitting region 62 of the parallax barrier 6 projected onto the active area 51 from a point at an optimal viewing distance where the user's eyes are located. The image pitch k is equal to the width in the x direction of the combined region of the first region 52 and the second region 53 adjacent to each other.

Figure 14:
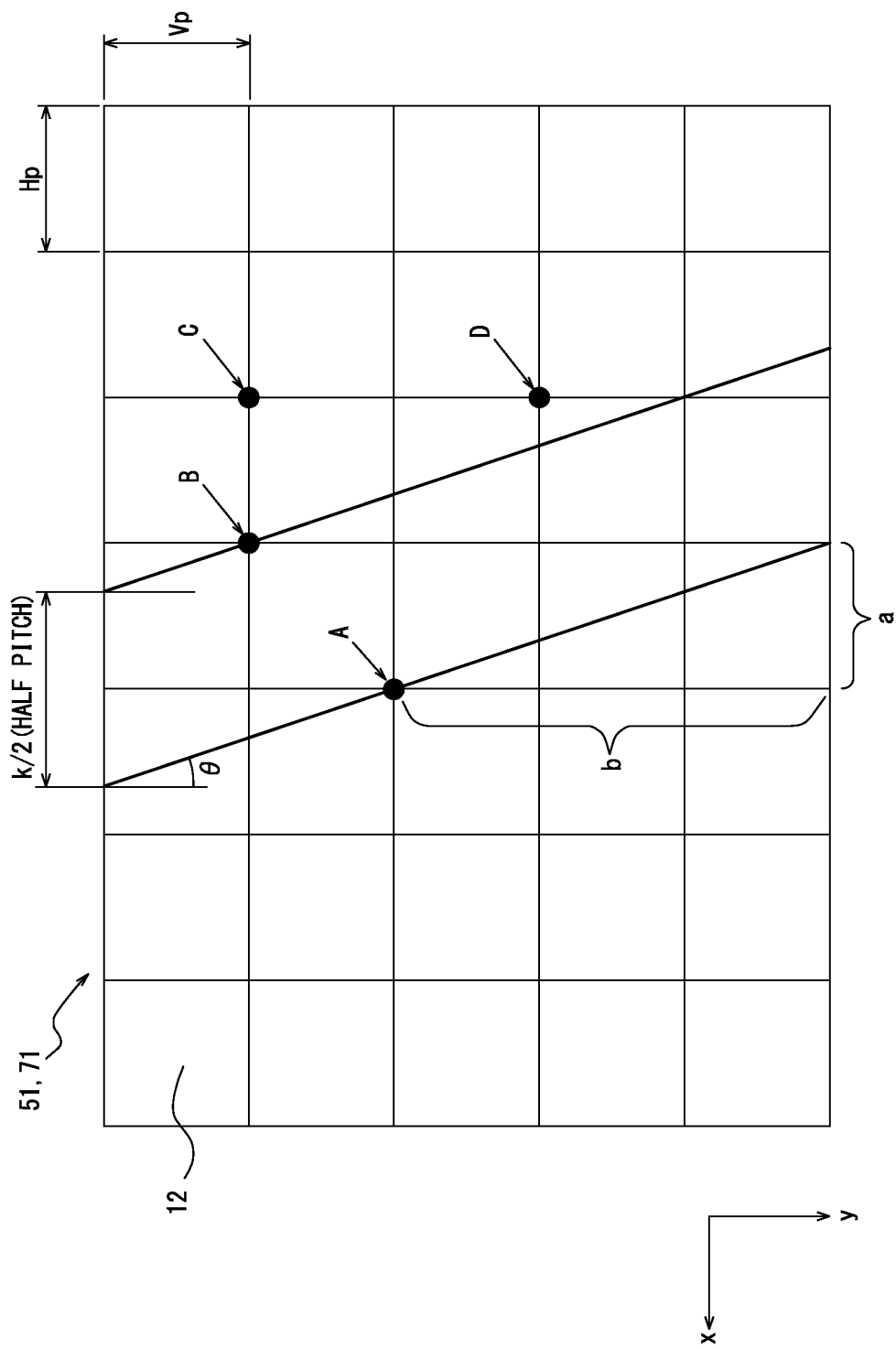
FIG. 14 is a diagram illustrating a method of determining a barrier tilt angle and a barrier pitch and subpixels included in one group.

In FIG. 14, the barrier tilt angle θ is set such that the contour line 63 indicating the boundary between the dimming region 61 and the light transmitting region 62 of the parallax barrier 6 projected on the active area 51 crosses natural number "b" vertical pitches Vp while crossing natural number "a" horizontal pitches Hp. That is, the barrier tilt angle θ (third direction) is the direction in which b pieces of pixels advance in the y direction while a pieces of pixels advance in the x direction. The barrier tilt angle θ satisfies the following Equation (1), where a and b are natural numbers.

[Formula 1]

$$\tan\theta = \frac{a \times Hp}{b \times Vp} \text{ and } a \neq b \quad (1)$$

In the example of FIG. 14, a=1 and b=3. In the example of FIG. 4, a=1 and b=6. Therefore, it is possible to reduce the occurrence of moire, and the like. As a and b, a combination of integers other than 0 that are relatively prime can be adopted.

Two straight lines with a barrier tilt angle θ are then set to pass through different vertices of the same or different pixels 12. The image pitch k is determined by setting the horizontal distance between the straight lines as half of the image pitch k. In the example of FIG. 14, two straight lines with a barrier tilt angle θ pass through the two vertices A and B. In this example, k=8 Hp/3. In the example of FIG. 4, the image pitch is k=7 Hp/3. The two vertices A and B can be selected arbitrarily. For example, in FIG. 14, a straight line passing through vertex C or vertex D may be selected instead of the straight line passing through vertex B.

Next, the number of pixels included in one group 54 is calculated based on the image pitch k. The number 2n of pixels included in the group 54 and the image pitch k have the relationship of the following Equation (2).

[Formula 2]

$$k = 2n \times \frac{Hp}{b} \quad (2)$$

2n is equal to the number of subpixels 11 for each color included in the group 54. In the example of FIG. 14, 2n is 8. In the example of FIG. 4, 2n is 14. The subpixels 11 included in the group 54 can be arranged on two straight lines with a slope of a barrier tilt angle θ and between the two straight lines, in a height range of b pieces of pixels vertically.

Second Example of Group of Subpixels

Figure 15:
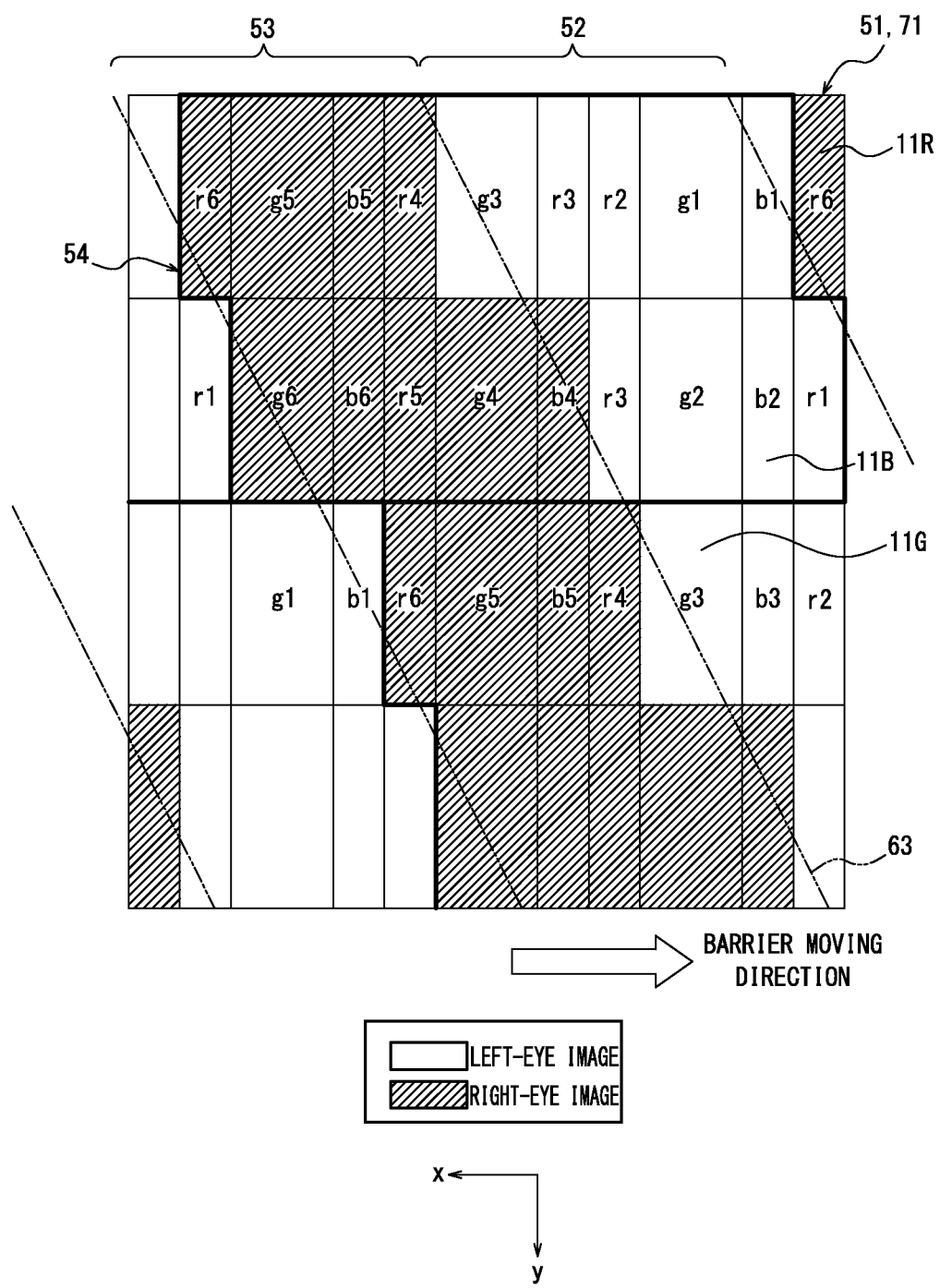
FIG. 15 is a diagram showing a second example of a group of subpixels on the display panel.

FIG. 15 is the group 54 of subpixels 11 according to the second example. In this example, a=1, b=2, k=3 Hp, and 2n=6 are set. In FIG. 15, the red subpixels 11R of numbers r1 to r3, the green subpixels 11G of numbers g1 to g3, and the blue subpixels 11B of numbers b1 to b3 display the left eye image. The red subpixels 11R of numbers r4 to r6, the green subpixels 11G of numbers g4 to g6, and the blue subpixels 11B of numbers b4 to b6 display the right eye image. Here, when the parallax barrier 6 is moved to the relatively negative side in the x direction, the controller first switches the left eye image and the right eye image between the green subpixel 11G of number g6 and the green subpixel 11G of number g3. The controller 7 then switches the display of the left eye image and the right eye image between the red subpixel 11R of number r6 and the red subpixel 11R of number r3, and between the blue subpixel 11B of number b6 and the blue subpixel 11B of number b3. Similarly, the images displayed by the two subpixels 11 of respective colors are sequentially switched between the left eye image and the right eye image.

Third Example of a Group of Subpixels

Figure 16:
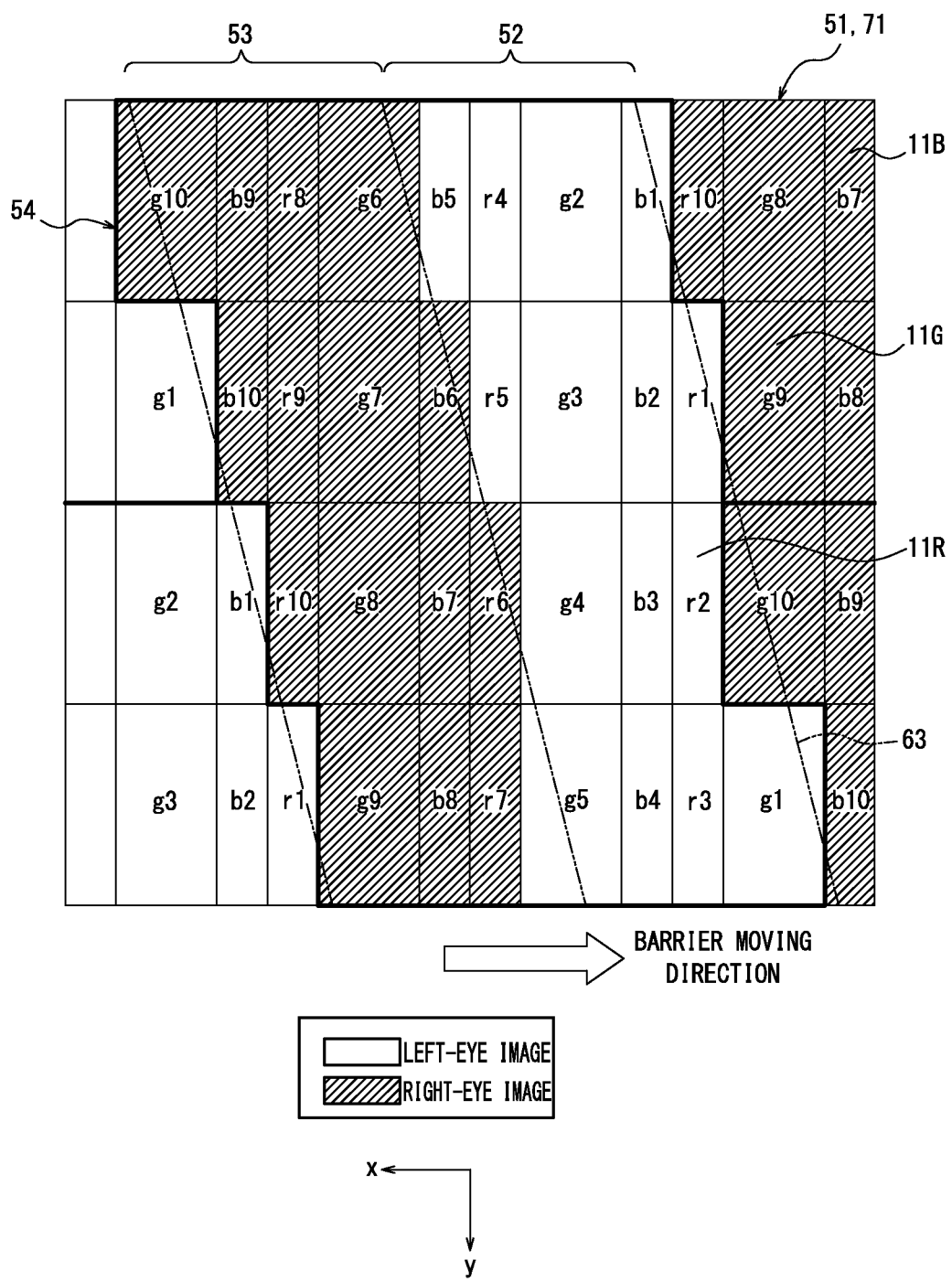
FIG. 16 is a diagram showing a third example of a group of subpixels on the display panel.

FIG. 16 shows the group 54 of subpixels 11 according to the third example. Here, a=1, b=4, k=5 Hp/2, and 2n=10 are set. In FIG. 16, the red subpixels 11R of numbers r1 to r5, the green subpixels 11G of numbers g1 to g5, and the blue subpixels 11B of numbers b1 to b5 are displayed in the left eye image. The red subpixels 11R of numbers r6 to r10, the green subpixels 11G of numbers g6 to g10, and the blue subpixels 11B of numbers b6 to b10 display the right eye image. Here, when the parallax barrier 6 is moved to the relatively negative side in the x direction, the controller 7 first switches the left eye image and the right eye image between the green subpixel 11G of number g10 and the green subpixel 11G of number g5. Next, the controller 7 performs the replacement of the left eye image and the right eye image between the red subpixel 11R of number r10 and the red subpixel 11R of number r5, and between the blue subpixel 11B of number b10 and the blue subpixel 11B of number b5. Similarly, the images displayed by the two subpixels 11 of respective colors are sequentially replaced between the left eye image and the right eye image.

As described above, according to the image display system 1 and the image display device 3 of the disclosure, the controller 7 can appropriately switch between the right eye image and the left eye image displayed in the subpixel 11 while using the display panels 5 having different lengths of the subpixels 11 in the parallax direction. As a result, it is possible to reduce the occurrence of crosstalk while maintaining a high aperture ratio, and thus, a three-dimensional image can be appropriately displayed without reducing the brightness of the image. As a result, the user of the image display system 1 and the image display device 3 can appropriately and visually recognize the three-dimensional image. When the image displayed by one subpixel 11 is switched from the left eye image to the right eye image, the image displayed by another subpixel 11 of the same color is switched from the right eye image to the left eye image at the same timing, and thus, flicker associated with image switching is reduced.

By using the parallax barrier 6 as an optical element configured to define the light beam direction of the image displayed on the display panel 5, a three-dimensional image can be displayed with a simple configuration. Since the dimming region 61 of the parallax barrier 6 extends in the oblique direction intersecting the x direction and the y direction, the occurrence of moire can be reduced.

The controller 7 is configured to change the left eye image and the right eye image at different timings for each of the R, G, and B colors. The controller 7 is configured to adjust the switching origin for each of the R, G, and B colors and control the switching timing independently for each color. As a result, it is possible to switch the image displayed by the subpixel 11 at an appropriate timing, corresponding to various lengths in the x direction that differ depending on the color of the subpixel 11.

The design method of the disclosure can appropriately determine the group 54 of the subpixels 11 controlled by the parallax barrier 6 and the controller 7 when the display panels 5 having different lengths of the subpixels 11 in the parallax direction are used. Thereby, with the design method of the disclosure, the image display system 1 and the image display device 3 that realize a three-dimensional image display can be designed. By using this design method, the image display system 1 and the image display device 3 can set the image pitch k to various values. As a result, the image display system 1 and the image display device 3 have a high degree of freedom in design.

[Image Display System that Uses Lenticular Lens for Optical Element]

Figure 17:
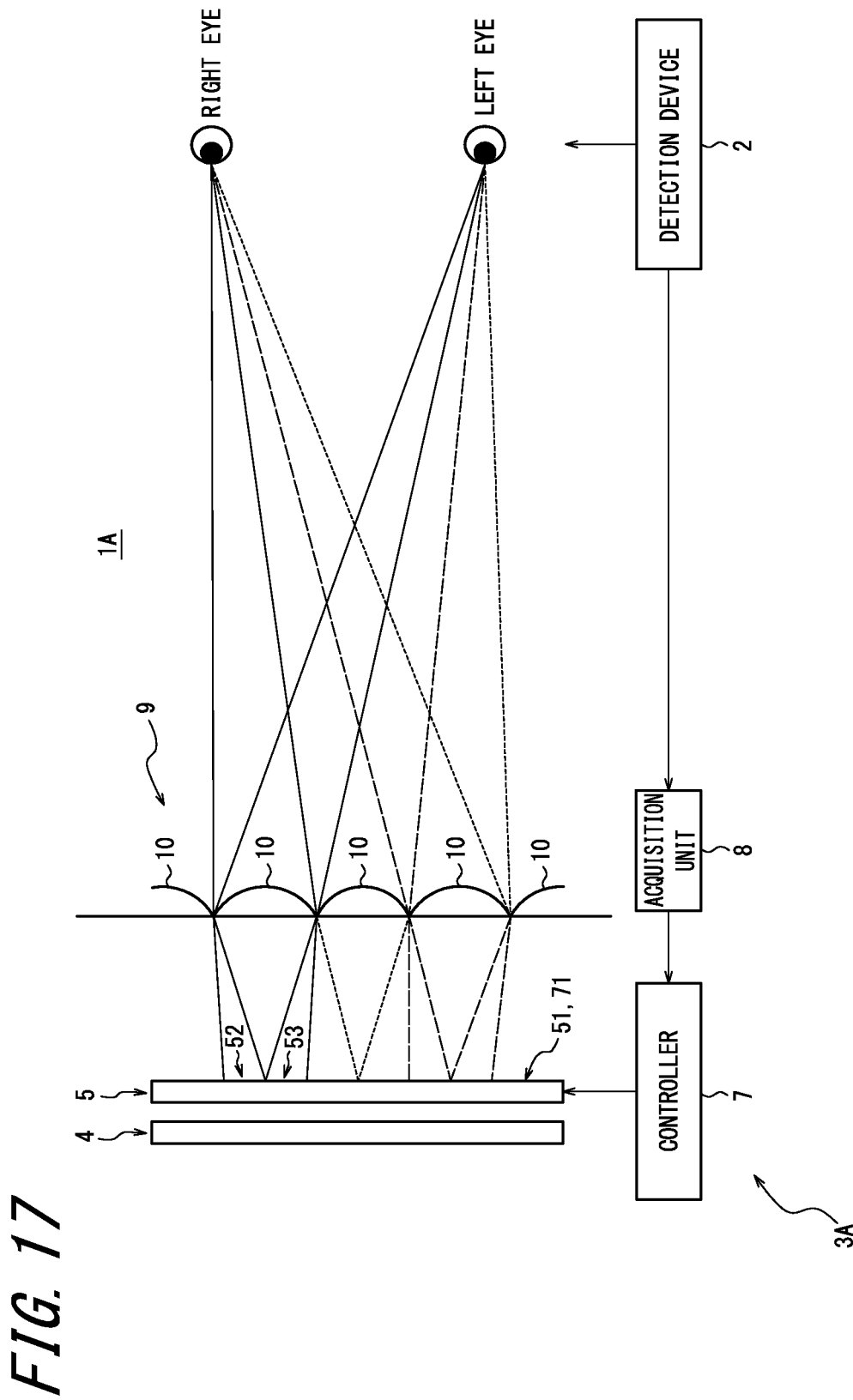
FIG. 17 is a schematic configuration diagram of an image display device when the optical element is a lenticular lens.

FIG. 17 shows an image display system 1A according to one of the plurality of embodiments. In FIG. 17, the components that are the same as or similar to the image display system 1 of FIG. 1 are denoted by the same reference numerals and the description thereof will be omitted. In the above-described embodiment, the image display device 3 includes the parallax barrier 6 as an optical element. An image display device 3A of the image display system 1A can include a lenticular lens 9 instead of the parallax barrier 6, as an optical element. Here, the lenticular lens 9 may be configured by arranging fine elongated semi-tubular type cylindrical lenses 10 extending obliquely in the x direction and the y direction.

The image display system 1A of FIG. 17 is of a type in which the user directly looks at the display panel 5. Therefore, the display surface 71 in the space visually perceived by the user coincides with the active area 51. The regions on the active area 51 of the display panel 5 configured to be visible from the left eye and the right eye of the user located at an optimal viewing distance can be designated as the first region 52 and the second region 53. The lenticular lens 9 is configured to deflect the image light of the left eye image emitted from the first region 52 of the display panel 5 toward the left eye of the user. The lenticular lens 9 is configured to deflect the image light of the right eye image emitted from the second region 53 of the display panel 5 toward the right eye of the user located at an optimal viewing distance. That is, the lenticular lens 9 is an optical element configured to define the light beam direction of the image displayed on the display panel 5. The display position of each subpixel 11 of the left eye image and the right eye image on the active area 51 considers the effects of refraction, deflection, and the like of the image light by each cylindrical lens 10 of the lenticular lens 9.

As shown in FIG. 2, the display panel 5 has a different length along the x direction for each color. As shown in FIG. 17, even when the lenticular lens 9 is used as the optical element, the controller 7 can control the display switching of the left eye image and the right eye image of each subpixel 11 as in the case of using the parallax barrier 6. That is, the image display system 1A and the image display device 3A can properly display a three-dimensional image without reducing the brightness of the image while using the display panel 5 having different lengths of the subpixels 11 in the x direction for each color.

[Head-Up Display]

Figure 18:
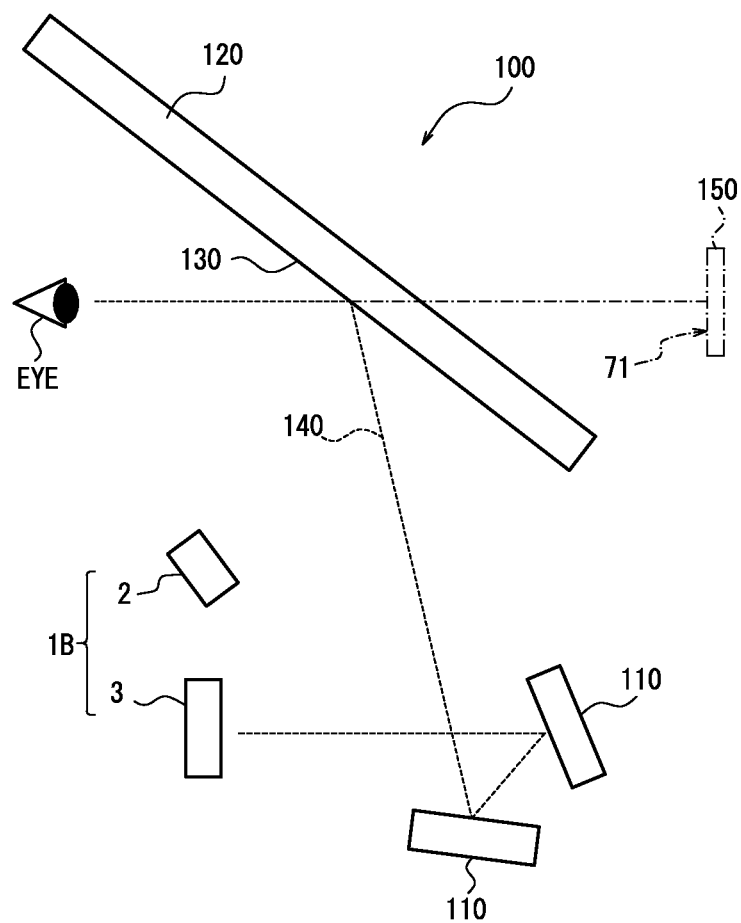
FIG. 18 is a schematic configuration diagram of a head-up display (HUD) according to one embodiment.

In one of the plurality of embodiments, an image display system 1B can be mounted on a head-up display 100, as shown in FIG. 18. The image display system 1B has the same or similar configuration as the image display system 1 of FIG. 1 except that the user does not look directly at the display panel 5. The image display system 1B includes the image display device 3 and the detection device 2. The components of the image display system 1B that are the same as or similar to the image display system 1 use the same reference numerals as those of the image display system 1 and the description thereof will be omitted. The head-up display 100 is also called a head up display (HUD). The HUD 100 includes the image display system 1B, one or more optical members 110, and a member for projection 120 having a plane for projection 130.

The optical member 110 and the member for projection 120 are included in an optical system that projects an image displayed in the active area 51 to form a virtual image in the user's field of view. In the disclosure, the optical member 110 and the member for projection 120 may be collectively and simply referred to as an optical system. The optical member 110 and the member for projection 120 can be reflective optical members that reflect the image light of the displayed image. The optical member 110 and the member for projection 120 may have a concave or convex reflective surface.

The HUD 100 is configured to allow the image light emitted from the image display system 1B to reach the plane for projection 130 of the member for projection 120 via the optical member 110. The HUD 100 is configured to allow the image light reflected by the plane for projection 130 to reach the left and right eyes of the user. That is, the HUD 100 is configured to allow the image light to travel from the image display system 1 to the left and right eyes of the user along the optical path 140 indicated by the broken line. The user can visually recognize the image light that has arrived along the optical path 140 as a virtual image 150.

The image display system 1B is configured to detect the positions of the left eye and the right eye of the user by the detection device 2. The controller 7 of the image display device 3 is configured to provide an image visually recognized as a stereoscopic image to the user by controlling the image displayed on the display panel 5 according to the detected positions of the left eye and the right eye.

In the HUD 100, the display surface 71 is located at the position where the virtual image 150 is displayed. The position where the virtual image 150 is displayed is a position where the user visually perceives the image displayed in the active area 51 as a virtual image.

Figure 19:
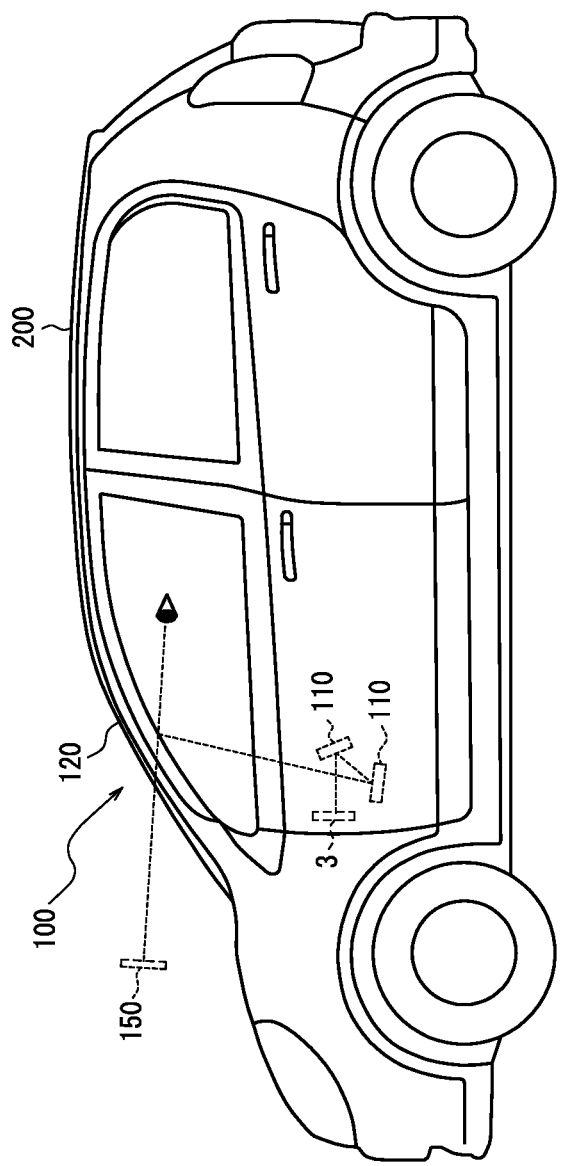
FIG. 19 is a diagram showing an example of a vehicle equipped with the HUD shown in FIG. 18.

As shown in FIG. 19, the HUD 100 may be mounted on a moving body 200 such as a vehicle. A part of the configuration of the HUD 100 may be shared with other devices and parts included in the moving body 200. For example, the HUD 100 may also use the windshield of the moving body 200 as the member for projection 120 of the HUD 100.

As described for the image display system 1, the HUD 100 of the disclosure can appropriately display a three-dimensional image without reducing the brightness of the image while using the display panels 5 having different lengths of the subpixels 11 in the parallax direction. As a result, the HUD 100 can display a bright image even when the HUD 100 is mounted on the moving body 200 and the windshield is the member for projection 120.

The "moving body" in the disclosure includes vehicles, vessels, and aircraft. "Vehicles" in the disclosure include, but are not limited to, automobiles and industrial vehicles and may include railway vehicles, living vehicles, and fixed-wing aircraft traveling on runways. Automobiles include, but are not limited to, passenger cars, trucks, buses, motorcycles, trolleybuses, and the like and may include other vehicles traveling on the road. Industrial vehicles include industrial vehicles for agriculture and construction. Industrial vehicles include, but are not limited to, forklifts and golf carts. Industrial vehicles for agriculture include, but are not limited to, tractors, tillers, transplanters, binders, combines, and lawnmowers. Industrial vehicles for construction include, but are not limited to, bulldozers, scrapers, excavators, cranes, dump trucks, and road rollers. Vehicles include those that run manually. The classification of vehicles is not limited to the above. For example, an automobile may include an industrial vehicle capable of traveling on a road and the same vehicle may be included in a plurality of classifications. Vessels in the disclosure include marine jets, boats, and tankers. Aircraft in the disclosure includes fixed-wing aircraft and rotary-wing aircraft.

The configuration according to the disclosure is not limited to the embodiments described above and can be modified or changed in many ways. For example, the functions included in each component, each step, and the like can be rearranged not to be logically inconsistent and a plurality of components and the like can be combined into one or divided.

In the disclosure, the descriptions such as "first" and "second" are identifiers for distinguishing the configuration. The configurations distinguished by the descriptions such as "first" and "second" in the disclosure can exchange the numbers in the configurations. For example, the first direction can exchange the identifiers "first" and "second" with the second direction. For example, in one embodiment above, red is the first color and green is the second color, but the first color and the second color may be arbitrarily replaced between red, blue, and green. The same applies to the first subpixel and the second subpixel. For example, in one embodiment above, the first eye and the second eye are the left eye and the right eye, respectively, but the first eye may be the right eye and the second eye may be the left eye. The exchange of identifiers takes place at the same time. Even after exchanging identifiers, the configuration is distinguished. The identifier may be removed. The configurations with the identifier removed are distinguished by reference numerals. Based solely on the description of identifiers such as "first" and "second" in the disclosure, it shall not be used for the interpretation of the order of the configurations, the basis for the existence of the lower number identifier, the basis for the existence of the higher number identifier.

In the above embodiment, the widths of the dimming region 61 and the light transmitting region 62 of the parallax barrier 6 in the x direction are equal. That is, the barrier aperture ratio of the parallax barrier 6 is 50%. Here, the left eye of the user can visually recognize the entire first region 52. The right eye of the user can visually recognize the entire second region 53. However, the barrier aperture ratio of the image display device 3 is not limited to 50%. In order to reduce crosstalk, the width in the x direction of the light transmitting region 62 can be made narrower than the width in the x direction of the dimming region 61. Crosstalk is a phenomenon in which a part of the left eye image enters the right eye of the user and/or a part of the right eye image enters the left eye of the user. Crosstalk can be reduced when the width in the x direction of the light transmitting region 62 is narrower than the width in the x direction of the dimming region 61. Here, the barrier aperture ratio is less than 50%.

REFERENCE SIGNS LIST 1, 1A, 1B: Image display system
2: Detection device
3, 3A: Image display device
4: Irradiator
5: Display panel (Display device)
6: Parallax barrier (Optical element)
7: Controller
8: Acquisition unit
9: Lenticular lens (Optical element)
10: Cylindrical lens
11: Subpixel
11R: Red subpixel (First subpixel)
11G: Green subpixel (Second subpixel)
11B: Blue subpixel
12: Pixel
15: Display boundary
51: Active area
52: First region
53: Second region
54: Group
61: Dimming region (Optical component)
62: Light transmitting region
63: Contour line
71: Display surface
100: Head-up display
110: Optical member
120: Member for projection
130: Plane for projection
140: Optical path
150: Virtual image
200: Moving body

The invention claimed is:

1. An image display device, comprising:
a display panel comprising a plurality of subpixels arranged in a grid along a first direction corresponding to a parallax direction of a user and a second direction intersecting the first direction;
an optical element configured to define a light beam direction of an image displayed on the display panel;
an acquisition unit configured to acquire a first position of a first eye of the user and a second position of a second eye of the user, the second eye being different from the first eye; and
a controller configured to be able to switch a display position for displaying a first image visually recognized by the first eye of the user and a second image visually recognized by the second eye of the user for each subpixel included in the plurality of subpixels based on the first position and the second position,
the plurality of subpixels comprising a plurality of first subpixels configured to emit light of a first color and a plurality of second subpixels configured to emit light of a second color different from the first color,
a length of the first subpixels along the first direction being different from a length of the second subpixels along the first direction, and
the controller being configured to
control the plurality of subpixels comprising the plurality of first subpixels and the plurality of second subpixels as a group,
change an image displayed by a first subpixel of the plurality of first subpixels from the first image to the second image at a first timing, and
change an image displayed by a second subpixel of the plurality of second subpixels from the first image to the second image at a second timing,
wherein the first timing is a timing different from the second timing.

2. The image display device according to claim 1, wherein the optical element comprises a plurality of optical components configured to be arranged along the first direction and define the light beam direction.

3. The image display device according to claim 2, wherein the optical components each comprise a dimming region which constitutes a parallax barrier and has a slit shape.

4. The image display device according to claim 2, wherein the optical components are arranged to face the display panel and extend along a third direction intersecting the first direction and the second direction.

5. The image display device according to claim 4, wherein the display panel comprises a plurality of pixels each comprising a predetermined number of subpixels including the first subpixel and the second subpixel,
the third direction is a direction in which b pieces of pixels advance in the second direction while a pieces of pixels advance in the first direction, and
a and b are integers other than 0 that are relatively prime.

6. The image display device according to claim 5, wherein a pitch in the first direction on the display panel of the optical components projected from a point at an optimal viewing distance where the user's eyes are located is defined by a distance in the first direction between two straight lines extending in the third direction that pass through two different vertices of the plurality of pixels.

7. The image display device according to claim 1, wherein a plurality of subpixels belonging to the group extend in a plane along the first direction and the second direction.

8. The image display device according to claim 1, wherein when the image displayed by the first subpixel is changed from the first image to the second image, the controller is further configured to change an image displayed by another first subpixel of the plurality of first subpixels from the second image to the first image.

9. An image display system, comprising:
a display panel comprising a plurality of subpixels arranged in a grid along a first direction corresponding to a parallax direction of a user and a second direction intersecting the first direction;
an optical element configured to define a light beam direction of an image displayed on the display panel;
a detection device configured to be able to detect a first position of a first eye of the user and a second position of a second eye of the user, the second eye being different from the first eye; and
a controller configured to be able to switch a display position for displaying a first image visually recognized by the first eye of the user and a second image visually recognized by the second eye of the user for each subpixel included in the plurality of subpixels based on the first position and the second position detected by the detection device,
the plurality of subpixels comprising a plurality of first subpixels configured to emit light of a first color and a plurality of second subpixels configured to emit light of a second color different from the first color,
a length of the first subpixels along the first direction being different from a length of the second subpixels along the first direction, and
the controller being configured to
control the plurality of subpixels comprising the plurality of first subpixels and the plurality of second subpixels as a group,
change an image displayed by a first subpixel of the plurality of first subpixels from the first image to the second image at a first timing, and
change an image displayed by a second subpixel of the plurality of second subpixels from the first image to the second image at a second timing,
wherein the first timing is a timing different from the second timing.

10. The image display system according to claim 9, wherein
when the image displayed by the first subpixel is changed from the first image to the second image, the controller is further configured to change an image displayed by another first subpixel of the plurality of first subpixels from the second image to the first image.

11. A head-up display, comprising:
a display panel comprising a plurality of subpixels arranged in a grid along a first direction corresponding to a parallax direction of a user and a second direction intersecting the first direction;
an optical element configured to define a light beam direction of an image displayed on the display panel;
a detection device configured to be able to detect a first position of a first eye of the user and a second position of a second eye of the user, the second eye being different from the first eye;
a controller configured to be able to switch a display position for displaying a first image visually recognized by the first eye of the user and a second image visually recognized by the second eye of the user for each subpixel included in the plurality of subpixels based on the first position and the second position detected by the detection device; and
an optical system configured to project a virtual image of the display panel, the optical system being arranged on a side of the display panel and the optical element on which side the user's eyes are positioned,
the plurality of subpixels comprising a plurality of first subpixels configured to emit light of a first color and a plurality of second subpixels configured to emit light of a second color different from the first color,
a length of the first subpixels along the first direction being different from a length of the second subpixels along the first direction, and
the controller being configured to
control the plurality of subpixels comprising the plurality of first subpixels and the plurality of second subpixels as a group,
change an image displayed by a first subpixel of the plurality of first subpixels from the first image to the second image at a first timing, and
change an image displayed by a second subpixel of the plurality of second subpixels from the first image to the second image at a second timing,
wherein the first timing is a timing different from the second timing.

12. The head-up display according to claim 11, wherein when the image displayed by the first subpixel is changed from the first image to the second image, the controller is further configured to change an image displayed by another first subpixel of the plurality of first subpixels from the second image to the first image.

13. A moving body, comprising:
a head-up display comprising
a display panel comprising a plurality of subpixels arranged in a grid along a first direction corresponding to a parallax direction of a user and a second direction intersecting the first direction;
an optical element configured to define a light beam direction of an image displayed on the display panel;
a detection device configured to be able to detect a first position of a first eye of the user and a second position of a second eye of the user, the second eye being different from the first eye;

a controller configured to be able to switch a display position for displaying a first image visually recognized by the first eye of the user and a second image visually recognized by the second eye of the user for each subpixel included in the plurality of subpixels based on the first position and the second position detected by the detection device; and an optical system configured to project a virtual image of the display panel, the optical system being arranged on a side of the display panel and the optical element on which side the user's eyes are positioned, the plurality of subpixels comprising a plurality of first subpixels configured to emit light of a first color and a plurality of second subpixels configured to emit light of a second color different from the first color, a length of the first subpixels along the first direction being different from a length of the second subpixels along the first direction, and the controller being configured to
- control the plurality of subpixels including the plurality of first subpixels and the plurality of second subpixels as a group,
- change an image displayed by a first subpixel of the plurality of first subpixels from the first image to the second image at a first timing, and
- change an image displayed by a second subpixel of the plurality of second subpixels from the first image to the second image at a second timing, wherein the first timing is a timing different from the second timing.

14. The moving body according to claim 13, wherein when the image displayed by the first subpixel is changed from the first image to the second image, the controller is further configured to change an image displayed by another first subpixel of the plurality of first subpixels from the second image to the first image.

15. An image display method, comprising:
acquiring a first position of a first eye of a user and a second position of a second eye of the user, by an acquisition unit, the second eye being different from the first eye;

displaying a first image or a second image on each of a plurality of subpixels which are included in the display panel and arranged in a grid along a first direction corresponding to a parallax direction of the user and a second direction intersecting the first direction, based on the first position and the second position by a controller; and causing the first image to reach the first eye of the user and the second image to reach the second eye of the user, by an optical element, the plurality of subpixels comprising a plurality of first subpixels configured to emit light of a first color and a plurality of second subpixels configured to emit light of a second color different from the first color, a length of the first subpixels along the first direction being different from a length of the second subpixels along the first direction, and the controller being configured to
- control the plurality of subpixels comprising the plurality of first subpixels and the plurality of second subpixels as a group,
- change an image displayed by a first subpixel of the plurality of first subpixels from the first image to the second image at a first timing, and
- change an image displayed by a second subpixel of the plurality of second subpixels from the first image to the second image at a second timing, wherein the first timing is a timing different from the second timing.

16. The image display method according to claim 15, wherein
when the image displayed by the first subpixel is changed from the first image to the second image, the controller is further configured to change an image displayed by another first subpixel of the plurality of first subpixels from the second image to the first image.

* * * * *